(12) United States Patent
Wang et al.

(10) Patent No.: US 12,063,353 B2
(45) Date of Patent: Aug. 13, 2024

(54) VIDEO ENCODING METHOD, VIDEO DECODING METHOD, AND RELATED DEVICE

(71) Applicant: TENCENT TECHNOLOGY (SHENZHEN) COMPANY LIMITED, Shenzhen (CN)

(72) Inventors: Yingbin Wang, Shenzhen (CN); Xiaozhong Xu, State College, PA (US); Shan Liu, San Jose, CA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 218 days.

(21) Appl. No.: 17/706,951

(22) Filed: Mar. 29, 2022

(65) Prior Publication Data

US 2022/0224888 A1    Jul. 14, 2022

Related U.S. Application Data

(63) Continuation of application No. PCT/CN2021/089583, filed on Apr. 25, 2021.

(30) Foreign Application Priority Data

Jun. 2, 2020   (CN) .......................... 202010487809.7

(51) Int. Cl.
*H04N 19/105*   (2014.01)
*H04N 19/176*   (2014.01)
(Continued)

(52) U.S. Cl.
CPC ......... *H04N 19/105* (2014.11); *H04N 19/176* (2014.11); *H04N 19/44* (2014.11); *H04N 19/436* (2014.11)

(58) Field of Classification Search
CPC ..... H04N 19/105; H04N 19/44; H04N 19/176
See application file for complete search history.

(56) References Cited

U.S. PATENT DOCUMENTS

| 11,595,694 B2* | 2/2023 | Xu .......................... H04N 19/11 |
| 2015/0010056 A1* | 1/2015 | Choi ..................... H04N 19/436 |
| | | 375/240.02 |

(Continued)

FOREIGN PATENT DOCUMENTS

| CN | 104853209 A | 8/2015 |
| CN | 104853211 A | 8/2015 |

(Continued)

OTHER PUBLICATIONS

Extended European Search Report regarding EP 21 817 776.4 dated Nov. 8, 2022, 9 pages.

(Continued)

*Primary Examiner* — Shawn S An
(74) *Attorney, Agent, or Firm* — Crowell & Moring LLP

(57) ABSTRACT

The present disclosure provides a video encoding method, a video decoding method, and a related device. The method includes: obtaining a bit stream of a current image, the bit stream comprising at least one largest coding unit (LCU) comprising a current LCU and an encoded LCU, the current LCU comprising a current decoding block comprising a current string; storing pixels in the current decoding block by using a first part of a storage space with a size of M*W, and storing at least some decoded blocks in the encoded LCU and the current LCU by using a second part of the storage space, M and W being positive integers, and M≥W; and searching the second part of the storage space for a reference string for the current string, obtaining a predicted value for the current string according to the reference string, and decoding the current string.

17 Claims, 8 Drawing Sheets

(51) Int. Cl.
*H04N 19/44* (2014.01)
*H04N 19/436* (2014.01)

(56) References Cited

U.S. PATENT DOCUMENTS

| | | | | |
|---|---|---|---|---|
| 2015/0341614 A1* | 11/2015 | Senoh | .............. | H04N 13/161 |
| | | | | 348/43 |
| 2016/0330455 A1* | 11/2016 | Lin | .............. | H04N 19/11 |
| 2017/0054988 A1* | 2/2017 | Lin | .............. | H04N 19/105 |
| 2017/0238001 A1* | 8/2017 | Li | .............. | H04N 19/593 |
| | | | | 375/240.12 |
| 2017/0295376 A1* | 10/2017 | Lee | .............. | H04N 19/513 |
| 2017/0332073 A1* | 11/2017 | Lin | .............. | H04N 19/593 |
| 2018/0139459 A1 | 5/2018 | Dawood | | |
| 2019/0325083 A1 | 10/2019 | Payer et al. | | |

FOREIGN PATENT DOCUMENTS

| | | | |
|---|---|---|---|
| CN | 106797473 A | 5/2017 | |
| CN | 112532988 A | 3/2021 | |
| EP | 3035683 A1 * | 6/2016 | .......... H04N 19/105 |

OTHER PUBLICATIONS

Xiazhong Xu et al., "Overview of Screen Content Coding in Recently Developed Video Coding Standards," arxiv.org, Cornell University Library, Online Library Cornell University, Ithaca, NY, Nov. 28, 2020.

Chen et al., "BoG on 1 D dictionary," JCT-VC Meeting; Jun. 30, 2014-Jul. 9, 2014; Sapporo; (Joint Collobrative Team on Video Coding of ISO/IEC JTC1/SC29/ WG11 and ITU-T SG.16 ); http://wftp3.itu.int/av-arch/jctvc-site/, No. JCTVC-R0336, Jul. 2, 2014.

Xu (Tencent) X et al., "CE8: CPR reference memory reuse without increasing memory requirement (CE8.1.2a and CE8.1d)," JVET Meeting; Oct. 9, 2019-Nov. 8, 2019; Marrakech; (The Joint Video Exploration Team of ISO/IEC JTC1/SC29/WG11 and ITU-T SG. 16 ), No. JVET-M0407 Jan. 17, 2019, Retrieved from the Internet: http://phenix/int-evry.fr/jvet/doc_end_user/documents/13_Marrakech/wg11 /JVET-M0407-v3.zip JVET-M0407-CE8.1.2a-CE8.1.2d-v3.docx.

Xu Xiaozhong et al., "Intra block copy in Vesatile Video Coding with Reference Sample Memory Reuse," 2019 Picture Coding Symposium (PCS), IEEE, Nov. 12, 2019, pp. 1-5.

Chao Pang et al., "AhG5: Fast encoder search and search region restriction for intra block copying," Joint Collaborative Team on Video Coding (JCT-VC), Input Document to JCT-VC, Nov. 1, 2013, 5 pages.

International Search Report with English translation and Written Opinion regarding PCT/CN2021/089583 dated Jul. 15, 2021, 9 pages.

First Chinese Office Action with English concise explanation regarding CN202010487809.7 dated Jul. 6, 2021, 10 pages.

Second Chinese Office Action with English concise explanation regarding CN202010487809.7 dated Dec. 21, 2021, 9 pages.

* cited by examiner

VIDEO ENCODING METHOD, VIDEO DECODING METHOD, AND RELATED DEVICE

RELATED APPLICATION

This application is a continuation application of PCT Patent Application No. PCT/CN2021/089583, filed on Apr. 25, 2021, which claims priority to Chinese Patent Application No. 202010487809.7 filed with the China National Intellectual Property Administration on Jun. 2, 2020, both of which are incorporated herein by reference in their entireties.

FIELD OF THE TECHNOLOGY

The present disclosure relates to the field of video codec technologies, and in particular, to video codec.

BACKGROUND OF THE DISCLOSURE

On one hand, the Internet is about to enter a new era of 5th generation mobile networks, 5th generation wireless systems, or 5th generation (5G), and images (videos) appearing in various Internet applications have become the main consumer of Internet bandwidth. In particular, the mobile Internet image traffic grows increasingly and even will be explosively increased in the 5G era, which provides a brand-new powerful driving force for the accelerated development of image codec technologies. Meanwhile, a lot of new severe challenges which have not been encountered in the past are proposed for the image codec technologies. In the 5G era, the Internet of everything is achieved, and new Internet images generated in various emerging applications are diverse and different. Therefore, it has become an urgent demand to study efficient image codec technologies according to the characteristics of diversity and differences of the new Internet images.

On the other hand, the amount of video data required for depict even a relatively short movie may be quite large, which may create difficulties when the data is transmitted in a streaming manner or in other manners over a communication network with a limited bandwidth capacity. Therefore, the video data is typically compressed before being transmitted over a modern telecommunication network. Before transmission, a video compression device typically encodes the video data by using software and/or hardware on a source side, to reduce the amount of data required for representing digital video images. Subsequently, a video decompression device receives the compressed data at a destination and the video decompression device decodes the video data. Improved compression and decompression technologies that improve image quality without increasing bit rate are required to face limited network resources and increasing requirements for relatively high video quality.

A string prediction solution (also referred to as an intra string copy technology or a string matching technology) in the related art has a part that is not conductive to hardware implementation.

Therefore, a new video encoding method, a video decoding method, an electronic device, and a computer-readable storage medium are required.

The information disclosed in the foregoing related art is only used for enhancing the understanding of the background of the present disclosure.

SUMMARY

Embodiments of the present disclosure provide a video encoding method, a video decoding method, an electronic device, and a computer-readable storage medium, which can simplify hardware implementation of string prediction, increasing the efficiency of video coding/decoding, leading to improvement in the multimedia field and video compression/decompression technology.

The present disclosure describes a method for decoding video. The method includes obtaining, by a device, a bit stream of a current image, the bit stream comprising at least one largest coding unit (LCU), the at least one LCU comprising a current LCU and an encoded LCU that correspond to the current image, the current LCU comprising a current decoding block, and the current decoding block comprising a current string. The device includes a memory storing instructions and a processor in communication with the memory. The method further includes: storing, by the device, pixels in the current decoding block by using a first part of a storage space with a size of M*W, and storing at least some decoded blocks in the encoded LCU and the current LCU by using a second part of the storage space, M and W being positive integers, and M being greater than or equal to W; and searching, by the device, the second part of the storage space for a reference string for the current string, obtaining a predicted value for the current string according to the reference string, and decoding the current string.

The present disclosure describes an apparatus for decoding video. The apparatus includes a memory storing instructions; and a processor in communication with the memory. When the processor executes the instructions, the processor is configured to cause the apparatus to perform: obtaining a bit stream of a current image, the bit stream comprising at least one largest coding unit (LCU), the at least one LCU comprising a current LCU and an encoded LCU that correspond to the current image, the current LCU comprising a current decoding block, and the current decoding block comprising a current string, storing pixels in the current decoding block by using a first part of a storage space with a size of M*W, and storing at least some decoded blocks in the encoded LCU and the current LCU by using a second part of the storage space, M and W being positive integers, and M being greater than or equal to W, and searching the second part of the storage space for a reference string for the current string, obtaining a predicted value for the current string according to the reference string, and decoding the current string.

The present disclosure describes a non-transitory computer-readable storage medium, storing computer-readable instructions. The computer-readable instructions, when executed by a processor, are configured to cause the processor to perform: obtaining a bit stream of a current image, the bit stream comprising at least one largest coding unit (LCU), the at least one LCU comprising a current LCU and an encoded LCU that correspond to the current image, the current LCU comprising a current decoding block, and the current decoding block comprising a current string; storing pixels in the current decoding block by using a first part of a storage space with a size of M*W, and storing at least some decoded blocks in the encoded LCU and the current LCU by using a second part of the storage space, M and W being positive integers, and M being greater than or equal to W; and searching the second part of the storage space for a reference string for the current string, obtaining a predicted value for the current string according to the reference string, and decoding the current string.

Other characteristics and advantages of the present disclosure become apparent from the following detailed description, or may be learned in part through the practice of the present disclosure.

According to another aspect, an embodiment of the present disclosure provides a video encoding method, including: obtaining a current image, the current image including a largest coding unit, the largest coding unit including a current largest coding unit and an encoded largest coding unit, the current largest coding unit including a current encoding block, and the current encoding block including a current string; storing pixels in the current encoding block by using a first part of a storage space with a size of M*W, and storing at least some encoded blocks in the encoded largest coding unit and the current largest coding unit by using a second part of the storage space, M being a positive integer greater than or equal to W; and searching the second part of the storage space for a reference string of the current string, obtaining a predicted value of the current string according to the reference string, and encoding the current string.

According to another aspect, an embodiment of the present disclosure provides a video decoding method, including: obtaining a bit stream of a current image, the bit stream including a largest coding unit, the largest coding unit including a current largest coding unit and an encoded largest coding unit, the current largest coding unit including a current decoding block, and the current decoding block including a current string; storing pixels in the current decoding block by using a first part of a storage space with a size of M*W, and storing at least some decoded blocks in the encoded largest coding unit and the current largest coding unit by using a second part of the storage space, M being a positive integer greater than or equal to W; and searching the second part of the storage space for a reference string of the current string, obtaining a predicted value of the current string according to the reference string, and decoding the current string.

According to another aspect, an embodiment of the present disclosure further provides a computer-readable storage medium, storing a computer program, the program, when being executed by a processor, implementing the video encoding method or the video decoding method according to the foregoing aspects.

According to another aspect, an embodiment of the present disclosure provides an electronic device, including at least one processor; and a storage apparatus, configured to store at least one program, the at least one program, when being executed by the at least one processor, causing the at least one processor to implement the video encoding method or the video decoding method according to the foregoing aspects.

According to still another aspect, an embodiment of the present disclosure provides a computer program product including instructions, the computer program product, when run on a computer, causing the computer to perform the video encoding method or the video decoding method according to the foregoing aspects.

In the technical solution provided in some embodiments of the present disclosure, pixels in the current encoding block are stored by using a first part of a storage space with a size of M*W, and at least some encoded block in the encoded largest coding unit and the current largest coding unit are stored by using a second part of the storage space, M being a positive integer greater than or equal to W. In addition, it is limited that the second part of the storage space is searched for a reference string of the current string, so that hardware implementation of string prediction can be simplified.

In the technical solution provided in some embodiments of the present disclosure, by limiting a position of a reference string of a string in a string prediction technology, a reconstructed dependency relationship between different strings can be released. Therefore, different strings can be reconstructed in parallel, thereby simplifying the hardware implementation of string prediction and improving the implementation efficiency of string prediction.

It is to be understood that the above general descriptions and the following detailed descriptions are merely for exemplary and explanatory purposes, and cannot limit the present disclosure.

BRIEF DESCRIPTION OF THE DRAWINGS

The accompanying drawings herein, which are incorporated in the specification as a part of the specification, show embodiments in accordance with the present disclosure, and together with the specification are used to explain the principle of the present disclosure. Apparently, the accompanying drawings in the following description show merely some embodiments of the present disclosure, and a person of ordinary skill in the art may still derive other drawings from these accompanying drawings without creative efforts. In the accompanying drawings.

DESCRIPTION OF EMBODIMENTS

Figure 1:
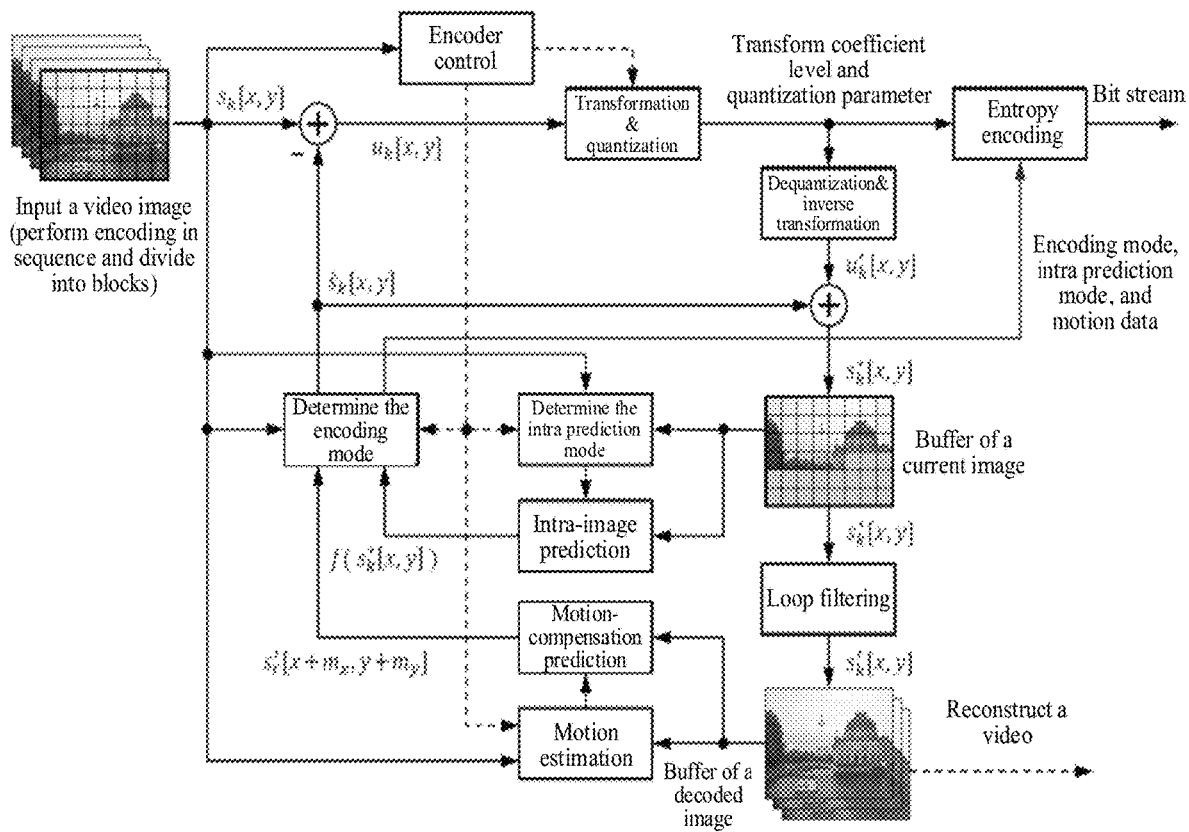
FIG. 1 is a basic schematic block diagram of video encoding in the related art.

Exemplary implementations are now described more comprehensively with reference to the accompanying drawings. However, the examples of implementations may be implemented in various forms, and it is not to be understood as being limited to the examples described herein. Conversely, the implementations are provided to make the present disclosure more comprehensive and complete, and comprehensively convey the idea of the examples of the implementations to a person skilled in the art.

In addition, the described features, structures or characteristics may be combined in one or more embodiments in any appropriate manner. In the following descriptions, many specific details are provided to obtain a thorough understanding of the embodiments of the present disclosure. However, a person skilled in the art is to be aware that, the technical solutions of the present disclosure may be implemented without one or more specific details, or another method, component, apparatus, step, and the like may be used. In other cases, well-known methods, apparatuses, implementations, or operations are not shown or described in detail to avoid obscuring aspects of the present disclosure.

The block diagrams shown in the accompanying drawing are merely functional entities and do not necessarily correspond to physically independent entities. That is, the functional entities may be implemented in a software form, or in at least one hardware module or integrated circuit, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

First, some terms involved in embodiments of the present disclosure are described.

AVS: audio video coding standard.
HEVC: high efficiency video coding, also referred to as H.265.
VVC: versatile video coding, also referred to as H.266.
Intra (picture) prediction.
Inter (picture) prediction.
SCC: screen content coding.
Loop filtering.
QP: quantization parameter.
LCU: largest coding unit.
CTU: coding tree unit, which is generally divided from a largest coding unit.
CU: coding unit.
PU: prediction unit.
MV: motion vector.
MVP value: motion vector prediction value.
MVD: motion vector difference, which is a difference between an MVP value and a real estimation value of an MV.
AMVP: advanced motion vector prediction.
ME: motion estimation, a process of obtaining a motion vector (MV) is referred to as motion estimation, which is a technology in motion compensation (MC).
MC: a process of obtaining an estimation value of a current image according to a motion vector and an inter prediction method. Motion compensation is a method for describing a difference between adjacent frames (adjacent herein means that two frames are adjacent in an encoding relationship but are not necessarily adjacent in a playback order), and specifically is for describing how each small block of a previous frame in the adjacent frames moves to a position of a current frame in the adjacent frames. The method is often used by a video compression device/a video codec to reduce spatial redundancy in a video sequence. Adjacent frames are usually similar, that is, include a lot of redundancy. The objective of using motion compensation is to improve a compression rate by removing the redundancy.
I slice: intra slice. An image may be divided into one frame or two fields, and a frame may also be divided into one or more slices.

In terms of a signal obtaining manner, a video signal may be photographed by a camera or generated by a computer. A compression encoding manner corresponding to the video signal may also vary according to different statistical characteristics.

Some video encoding technologies such as HEVC, VVC, and AVS adopt a hybrid encoding framework. As shown in FIG. 1, images (pictures) in an input original video signal (an input video) are encoded sequentially and then the following series of operations and processing are performed.

(1) Block partition structure: An input image is divided into a plurality of processing units that do not overlap with each other, and a similar compression operation is performed on each processing unit. The processing unit may be referred to as a CTU or an LCU. Finer division may be further performed after the CTU or the LCU is obtained, to obtain at least one basic coding unit, which is referred to as a CU. Each CU is a basic element in an encoding link. The following describes various encoding manners adopted for each CU.

(2) Predictive coding includes intra prediction and inter prediction. An original video signal is predicted by using a selected reconstructed video signal, to obtain a residual video signal. An encoder side needs to select a most suitable predictive coding mode from a plurality of possible predictive coding modes for the current CU and notifies a decoder side.

a. Intra prediction: Predicted signals are from an encoded reconstructed region of a same image.

A basic ideal of the intra prediction is to remove spatial redundancy by using correlation between adjacent pixels. During video encoding, adjacent pixels refer to reconstructed pixels of encoded CUs around a current CU.

b. Inter prediction: Predicted signals are from other encoded images (or referred to as reference images) different from a current image.

(3) Transform & Quantization: The residual video signal is converted into a transform domain, which is referred to as a transform coefficient, after transform operations such as discrete cosine transform (DFT) and discrete cosine transform (DCT). A lossy quantization operation is further performed on the residual video signal in the transform domain, to lose particular information, so that the quantized signal is favorable for a compressed expression.

In some video coding standards, there may be more than one transform manner for choose. Therefore, the encoder side also needs to select one transform manner for a current CU to be encoded and notifies the decoder side.

A degree of fineness of quantization is usually determined by a quantization parameter (QP). When a value of the QP is relatively large, it indicates that a transform coefficient with a larger value range is quantized to a same output, usually causing larger distortion and a relatively low code rate. Conversely, when the value of the QP is relatively small, it indicates that a transform coefficient with a relatively small value range is quantized to a same output, usually causing relatively small distortion and a relatively high code rate.

(4) Entropy coding or statistical coding: statistical compression encoding is performed on a quantized transform domain signal according to occurrence frequencies of values, and finally a binarized (0 or 1) compressed bit stream is outputted.

In addition, entropy coding also needs to be performed on another information such as a selected coding mode and a motion vector generated by encoding to reduce a code rate.

The statistical coding is a lossless coding manner and can effectively reduce a code rate required for expressing a same signal. A common statistical coding manner includes variable-length coding (VLC) or content adaptive binary arithmetic coding (CABAC).

(5) Loop filtering: operations of dequantization, inverse transformation, and prediction compensation (reverse operations of steps (2) to (4)) may be performed on an encoded image, to obtain a reconstructed decoded image. Compared with an original input image, due to an impact of quantization, a part of information of the reconstructed decoded image is different from that of the original input image, causing distortion. A filtering operation may be performed on the reconstructed decoded image by using a filter such as a deblocking filter, a sample adaptive offset (SAO) filter, or an adaptive loop filter, to effectively reduce a degree of distortion caused by quantization. Because the reconstructed decoded images after filtering will be used as a reference for subsequent encoding images to predict a future signal, the above filtering operation is also referred to as loop filtering and a filtering operation in an encoding loop.

FIG. 1 shows a basic flowchart of a video encoder. In FIG. 1, a $k^{th}$ CU (which is marked as $s_k[x, y]$) is used as an example for description. k is a positive integer greater than or equal to 1 and less than or equal to a quantity of CUs in an inputted current image, $s_k[x, y]$ represents a pixel point with coordinates of [x, y] in the $k^{th}$ CU, x represents a horizontal coordinate of the pixel point, and y represents a vertical coordinate of the pixel point. After better processing of motion compensation or intra prediction is performed on $s_k[x, y]$, a predicted signal $\hat{s}_k[x, y]$ is obtained. $s_k[x, y]$ is subtracted from $\hat{s}_k[x, y]$ to obtain a residual signal $u_k[x, y]$, and then transform and quantization are performed on the residual signal $u_k[x, y]$. Quantized outputted data has two different destinations: one is that the data is sent to an entropy encoder for entropy coding, and then an encoded bit stream is outputted to a buffer for storage and waits for transmission. The other is that dequantization and inverse transformation are performed on the data, to obtain a signal $u'_k[x, y]$, the signal $u'_k[x, y]$ is added to $\hat{s}'_k[x, y]$, to obtain a new predicted signal $s^*_k[x, y]$, and $s^*_k[x, y]$ is sent to a buffer of a current image for storage. Intra-image prediction is performed on $s^*_k[x, y]$, to obtain f ($s^*_k[x, y]$). Loop filtering is performed on $s^*_k[x, y]$, to obtain $s'_k[x, y]$, and $s'_k[x, y]$ is sent to a buffer of a decoded image for storage, to generate a reconstructed video. Motion-compensation prediction is performed on $s'_k[x, y]$, to obtain $s'_r[x+m_x, y+m_y]$, $s'_r[x+m_x, y+m_y]$ representing a reference block, and $m_x$ and $m_y$ respectively representing a horizontal component and a vertical component of a motion vector.

Some video coding standards such as HEVC, VVC, and AVS3 adopt a block-based hybrid coding framework. Original video data is divided into a series of encoding blocks according to the video coding standards, and the video data is compressed by using video encoding methods such as prediction, transform, and entropy coding. Motion compensation is a type of prediction method commonly used in video encoding. Based on redundancy characteristics of video content in time domain or space domain, a predicted value of a current encoding block is derived from an encoded region through motion compensation. The type of prediction method includes: inter prediction, intra block copy prediction, intra string copy prediction, and the like. In a specific encoding implementation, the prediction methods may be used alone or in combination. For encoding blocks using the prediction methods, it is usually necessary to explicitly or implicitly encode at least one two-dimensional displacement vector in a bit stream, indicating a displacement of a current block (or a co-located block of the current block) relative to at least one reference block of the current block.

Under different prediction modes and different implementations, the displacement vector may have different names. In the embodiments of the present disclosure, the displacement vector is uniformly described in the following manner: (1) a displacement vector during inter prediction is referred to as a motion vector (MV); (2) a displacement vector during intra block copy is referred to as a block vector or a block displacement vector; and (3) a displacement vector during intra string copy is referred to as a string vector (SV).

The following first describes a related technology in inter prediction.

Figure 2:
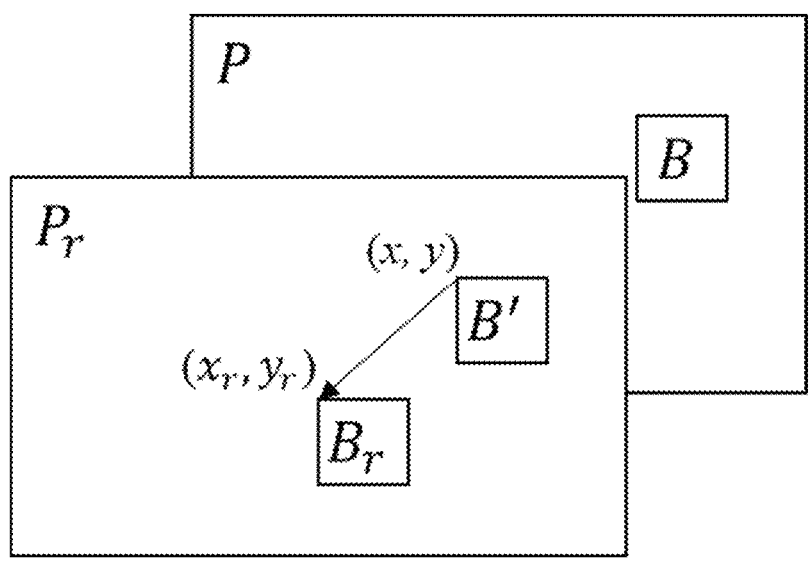
FIG. 2 is a schematic diagram of inter prediction in the related art.

FIG. 2 is a schematic diagram of inter prediction in the related art.

As shown in FIG. 2, the inter prediction is to predict a pixel of a current image by using correlation of time domain of a video and using a pixel of an adjacent encoded image, to effectively remove the time domain of the video, thereby effectively reducing bits of encoded residual data. P is a current frame, Pr is a reference frame, B is a current to-be-encoded block, and Br is a reference block of B. B' has a same coordinate position as B in an image.

It is assumed that coordinates of Br are (xr, yr), and coordinates of B' are (x, y). A displacement between the current to-be-encoded block B and the reference block Br of B is referred to as a motion vector (MV), that is, $$MV=(xr-x, yr-y) \quad (1)$$

Considering relatively strong correlation between adjacent blocks in time domain or space domain, bits required for encoding the MV may be further reduced by using an MV prediction technology. In H.265/HEVC, inter prediction includes two MV prediction technologies of merge and AMVP.

An MV candidate list is established for a current PU in a merge mode, and there are five candidate MVs (and corresponding reference images thereof). The five candidate MVs are traversed, and one MV with a minimum rate-distortion cost is selected as an optimal MV. If a codec establishes an MV candidate list in a same manner, an encoder needs to transmit an index of only the optimal MV in the MV candidate list.

The MV prediction technology of HEVC also has a skip mode, which is a special case of the merge mode. After the optimal MV is found in the merge mode, and if a current to-be-encoded block is basically the same as a reference block, no residual data needs to be transmitted, and only an index of an MV and a skip flag (a flag indicating whether encoding is in the skip mode) need to be transmitted.

The MV candidate list established in the merge mode includes two cases of space domain and time domain.

Figure 3:
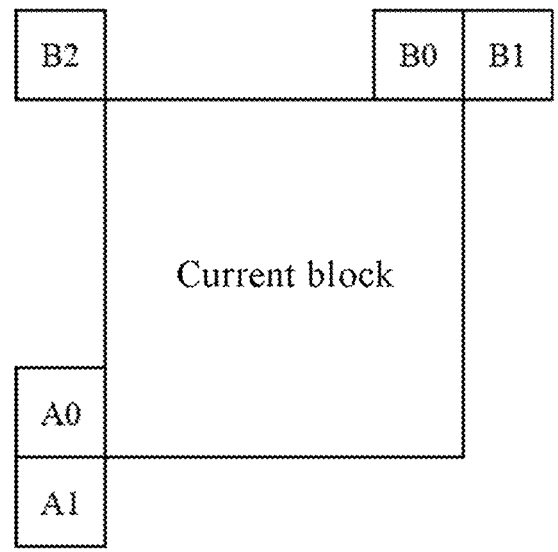
FIG. 3 is a schematic diagram of a position of candidate motion vector prediction (MVP) of space domain of a merge mode of inter prediction in the related art.

In the space domain, at most four candidate MVs are provided, and the four candidate MVs are established shown in FIG. 3. An MV candidate list of a current block in space domain is established according to a sequence of A1→B1→B0→A0→B2, B2 being a substitute, that is, when at least one of A1, B1, B0, or A0 does not exist, motion information of B2 needs to be used. That is, there are five candidate MVs in the MV candidate list, but at most 4 candidate MVs are used during HEVC (even if all the five candidate MVs exist), and when one candidate MV is unavailable, a next one is used in order.

Similar to the space domain, because adjacent blocks are used in the space domain, and an MV at a current position is predicted by using co-located (corresponding positions)

Figure 4:
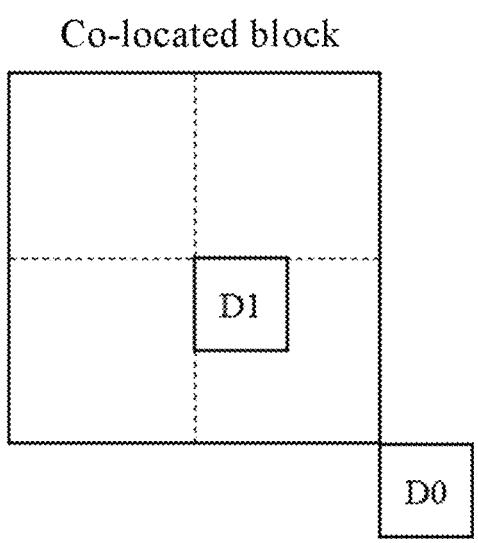
FIG. 4 is a schematic diagram of a position of candidate MVP of time domain of a merge mode of inter prediction in the related art.

PUs of adjacent frames in the time domain. At most one candidate MV is provided in the time domain, and the candidate MV is established shown in FIG. 4. All inter predicted images have reference images, for example, for a B frame, reference is made to a previous image. A current image is referred to as cur, a reference image of the current image is referred to as cur_ref, a co-located image of the current image is referred to as col, and a reference image of the co-located image is referred to as col_ref. It is assumed that a distance between the co-located image col and the reference image col_ref thereof is tb, and a distance between the current image cur and the reference image cur_ref thereof is td. During specific implementation, tb may be a difference between picture order counts (POCs) of the co-located image and the reference image thereof, and td may be a difference between POCs of the current image and the reference image thereof, which may be obtained by compressing an MV of a co-located PU according to the following formula:

$$curMV = td * colMV / tb \qquad (2)$$

curMV and colMV respectively represent MVs of a current PU and a co-located PU. In this way, an MV of the current image can be derived from the co-located image col. If a PU at a D0 position on a co-located block is unavailable, the PU at the D0 position is replaced with a co-located PU at a D1 position.

The MV candidate list established in the merge mode includes the two cases of the space domain and the time domain. A B slice further includes a manner of combining lists. A B frame is a frame that needs to make a reference to both a forward frame MV and a backward frame MV and includes two MV lists, which are a list 0 and a list. Therefore, for a PU in the B slice, because there are two MVs, the MV candidate list of the PU also needs to provide two MVPs. During HEVC, the first four candidate MVs in the MV candidate list are combined in pairs, to generate a combined list for the B slice.

In the merge mode mentioned above, MVP is directly used as an MV. An AMVP mode, similar to the merge mode, is to first establish a candidate prediction MV list for a current PU by using correlation between MVs of adjacent blocks in space domain and time domain. In the AMVP mode, a space domain candidate list and a time domain candidate list may be respectively established by using correlation between motion vectors in space domain and time domain, and then a final MVP is selected from the candidate lists. Different from the merge mode, in the AMVP mode, an optimal predicted MV, that is, an MVP, is selected from the candidate predicted MV list, and differential encoding is performed on the optimal predicted MV and an optimal MV (that is, a real MV) of a current to-be-encoded block obtained through motion search, that is, MVD=MV−MVP is encoded. By establishing a same list, a decoder side can calculate an MV of a current decoding block by requiring only sequence numbers of an MVD and an MVP in the list. In the AMVP mode, the candidate predicted MV list also includes two cases of space domain and time domain, and a difference lies in only two MVs in the list in the AMVP mode.

As described above, in the AMVP mode of HEVC, the MVD needs to be encoded. during HEVC, a resolution of the MVD is controlled by use_integer_mv_flag of slice_header (a slice header or a slice header or a slice data header). When a value of the flag is 0, the MVD is encoded with ¼ (luminance) pixel resolution. When the value of the flag is 1, the MVD is encoded with integer (luminance) pixel resolution.

During VVC, an adaptive motion vector resolution (AMVR) method is used. The method allows each CU to adaptively select a resolution for encoding an MVD. In a common AMVP mode, selectable resolutions include ¼ pixel, ½ pixel, 1 pixel, and 4 pixels. For a CU with at least one non-zero MVD component, one flag is first encoded to indicate whether to use ¼ luma sample MVD accuracy for the CU. If the flag is 0, the MVD of the current CU is encoded with a ¼ pixel resolution. Otherwise, a second flag needs to be encoded, to indicate a ½ pixel resolution or another MVD resolution is used for the CU. Otherwise, a third flag is encoded, to indicate whether to use a 1 pixel resolution or a 4 pixel resolution for the CU. In an affine AMVP mode, selectable resolutions include ¹⁄₁₆ pixel, ¼ (luminance) pixel, and 1 pixel.

Screen content is an image generated by an electronic device such as a computer, a mobile phone, or a television, and mainly include two types of content: one is non-continuous tone content generated by the computer, including a large quantity of small and sharp line shapes such as text, an icon, a button, and a grid. The other is a large amount of continuous tone content photographed by a camera, for example, a movie, a television program clip, and a natural image video. The video coding standards such as AVS and HEVC of the block-based hybrid coding manner in the related art have a high compression ratio for natural images and videos including a large amount of continuous content, but have a poor compression effect for the screen content including non-continuous tone content.

With the rapid development of cloud computing, mobile communication technologies, and wireless display technologies, how to display screen content on various electronic terminal devices with high quality at a low code rate is a problem to be resolved during SCC. To improve the screen content coding performance, an SCC version of an HEVC standard has been developed, and some tools that are beneficial to screen content coding have been adopted, for example, intra string copy (ISC, an intra string copy technology/string prediction technology/string matching technology).

A screen content coding effect is improved well through ISC and each coding unit (CU) in a two-dimensional image is converted into one dimension. An encoding block is divided into a series of pixel strings or unmatched pixels through ISC according to a scanning sequence (raster scanning, round-trip scanning, Zig-Zag scanning, or the like). A reference string of a same shape is found in an encoded region of a current image for each string, and a predicted value of a current string is derived. A residual between a pixel value and the predicted value of the current string is encoded, instead of directly encoding the pixel value, thereby effectively reducing bits.

Figure 5:
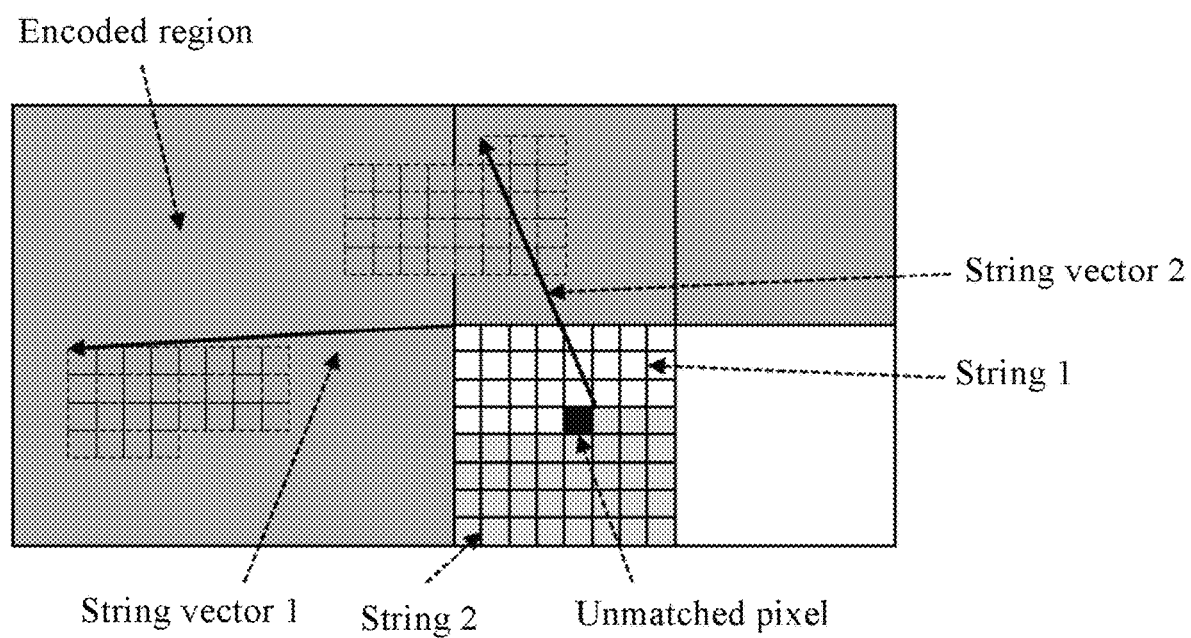
FIG. 5 is a schematic diagram of intra string copy (ISC) in the related art.

FIG. 5 is a schematic diagram of intra string copy. A dark region is an encoded region, 28 white pixels are a string 1, 35 light-colored pixels are a string 2, and one black pixel represents an unmatched pixel. If no corresponding reference pixel is found for a pixel in a referable region, the pixel is referred to as an unmatched pixel or referred to as an isolated point, and a pixel value of the unmatched pixel is directly encoded rather than derived from a predicted value of a reference string.

In an ISC technology, a string vector (SV), a string length, and a flag indicating whether there is a matched reference string corresponding to each string in a current encoding block need to be encoded. The string vector (SV) represents a displacement between a to-be-encoded string (a current string, that is, a current to-be-encoded string) and a reference string thereof. The string length represents a quantity of pixels included in the current string. In different implementations, the string length is encoded in a plurality of manners. Several examples are provided below (some examples may be used in combination): (1) a string length of a string is directly encoded in a bit stream; (2) a quantity of to-be-processed pixels after the current string is processed through encoding in the bit stream, the decoder side performs decoding according to a size P of a current encoding block and a quantity P2 of processed pixels, to obtain a quantity P2 of to-be-processed pixels except the current string, and obtains a string length L of the current string through calculation, that is, L=P−P1−P2, both L and P being integers greater than 0 and both P1 and P2 being integers greater than or equal to 0; and (3) a flag is encoded to indicate whether the string is the last string in a bit stream, and if the string is the last string, the string length L of the current string is obtained through calculation according to the size P of the current block and the quantity P1 of processed pixels, that is, L=P−P1. If no corresponding reference pixel is found in a referable region for a pixel, the pixel is used as an unmatched pixel, and a pixel value of the unmatched pixel is directly encoded.

A decoding process of ISC in a current solution is provided below:

syntax element. Details unrelated to the embodiments of the present disclosure are omitted in the foregoing process.

The current ISC solution has a part that is not conductive to hardware implementation. A solution provided by the embodiments of the present disclosure is used below to resolve at least one of the technical problems.

The method provided by the embodiments of the present disclosure is applicable to a product of a video codec or a video compression device using ISC, and is applicable to encoding and decoding of lossy data compression, and is also applicable to encoding and decoding of lossless data compression. The data involved in the encoding and decoding processes refers to one or a combination of the following examples:

(1) one-dimensional data;
(2) two-dimensional data;
(3) multi-dimensional data;
(4) graphic;
(5) image;
(6) image sequence;
(7) video;
(8) three-dimensional scene;
(9) constantly changed three-dimensional scene;
(10) virtual reality scene;
(11) constantly changed virtual reality scene sequence;
(12) image in a pixel form;
(13) transform domain data of an image;
(14) set of two-dimensional or more bytes;

```
sp_flag//decoding a string prediction flag
if(SpFlag){
    sp_dir_flag//decoding a flag of a scanning direction: 0 represents a vertical
direction, and 1 represents a horizontal direction,
    while(CurPixel<TotalPixel){
        sp_is_matched_flag//decoding whether the string prediction flag is a
matched flag and determining a type of a next remaining pixel belongs to: 0 represents an
unmatched pixel, 1 represents a string
        if(SpIsMatchedFlag)
        {
            sp_special_len_flag //decoding whether the string prediction flag is
a flag of the last string: 0 represents that the next remaining pixel is not the last string, 1
represents that the next remaining pixel is the last string
            if(SpSpecialLenFlag)
            {
                SpLength =width*height−CurPixel//without decoding, a
string length may be derived through calculation: the string length is obtained by subtracting a
size of a current CU (width represents a width of the current CU and height represents a height of
the current CU from a decoded string length (CurPixel);
            }
            else{
            {
                next_remaining_pixel_minus1//decoding the next remaining
pixel minus 1
                SpLength=width*height−CurPixel−
NextRemainingPixelMinus1−1//the string length is derived
            }
            decode_sv( ) //decoding a string vector, and a specific process is
omitted herein
            CurPixel+=SpLength;
        }
        else{
        {
            decode_pixel( )//decoding a pixel value of the unmatched pixel, and
a specific process is omitted herein
            CurPixel+=1;
        }
    }
}
```

In the decoding process, a field with a "_" indicates a syntax element that needs to be decoded, a field without "_" and with a capitalized first letter represents a variable, and a value of the variable may be obtained by decoding the

(15) set of two-dimensional or more bits;
(16) pixel set;
(17) set of three-component pixels (Y, U, V);
(18) set of three-component pixels (Y, Cb, Cr);

(19) set of three-component pixels (Y, Cg, Co);
(20) set of three-component pixels (R, G, B);
(21) set of four-component pixels (C, M, Y, K);
(22) set of four-component pixels (R, G, B, A);
(23) set of four-component pixels (Y, U, V, A);
(24) set of four-component pixels (Y, Cb, Cr, A); and
(25) set of four-component pixels (Y, Cg, Co, A).

When data is the above-listed image, or the image sequence, or the video, an encoding block is an encoding region of the image, and includes at least one of the following: a group of images, a predetermined quantity of images, an image, an image frame, a field image, a sub-image of the image, a slice, a macroblock, a largest coding unit (LCU), a coding tree unit (CTU), or a coding unit (CU).

Figure 6:
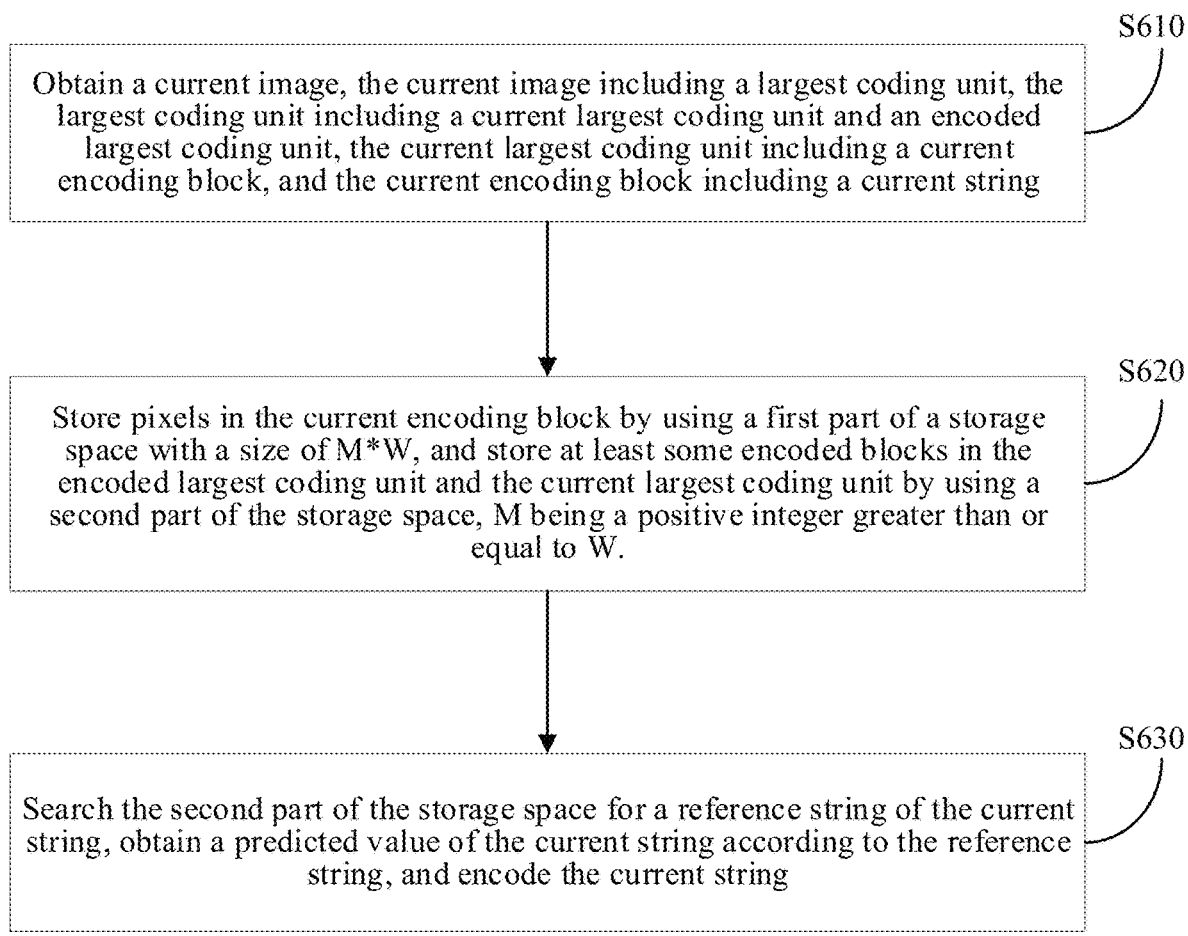
FIG. 6 is a schematic diagram of a video encoding method according to an embodiment of the present disclosure.

FIG. 6 is a schematic diagram of a video encoding method according to an embodiment of the present disclosure. The methods involved in the embodiments of the present disclosure may be used alone or may be used in combination together. An embodiment in FIG. 6 is described by using an encoder side as an example. The encoder side corresponds to a decoder side. The encoder side performs a series of analysis to determine a value of each syntactic element. An analysis process is not limited in the present disclosure. The encoder side described herein may be a video compression device deployed with a video encoder. The video compression device includes a device of a terminal device, a server, or the like with a function of implementing the video encoder.

As shown in FIG. 6, the method provided in various embodiments of the present disclosure may include the following steps.

S610. Obtain a current image, the current image including a largest coding unit, the largest coding unit including a current largest coding unit and an encoded largest coding unit, the current largest coding unit including a current encoding block, and the current encoding block including a current string.

In various embodiments of the present disclosure, an encoder on an encoder side receives an original video signal and sequentially encodes images in the original video signal. Herein, a current to-be-encoded image is referred to as a current image, which may be any image frame in the original video signal, On the encoder side, block partition may be performed on the current image. For example, the current image is divided into a plurality of CTUs or LCUs that do not overlap with each other. Finer division may be further performed on the CTU, to obtain at least one CU. Herein, a current to-be-encoded CU is referred to as a current encoding block, but is not limited in the present disclosure, for example, may further be referred to as a PU or a TU. In the following example descriptions, an example of a CU is used for description. A CTU corresponding to a current CU is referred to as a current CTU, and a CTU that is in an encoded region of the current image and is not the current CTU is referred to as an encoded CTU.

In various embodiments of the present disclosure, pixels in the current CU are encoded through ISC, and the pixels in the current CU are divided into strings or unmatched pixels according to a scanning sequence. A reference string of a same shape is found in the encoded region of the current image for each string, and a string of which a reference string is to be found currently is referred to as a current string.

S620. Store pixels in the current encoding block by using a first part of a storage space with a size of M*W, and store at least some encoded blocks in the encoded largest coding unit and the current largest coding unit by using a second part of the storage space, M being a positive integer greater than or equal to W.

In various embodiments of the present disclosure, both M and W are positive integers greater than or equal to 1, and M may be greater than or equal to W. For example, M=W=128 may be set. In another example, M=256 and W=128 may be set. In the following example descriptions, an example of M=W=128 is used for description, but is not limited in the present disclosure.

Figure 7:
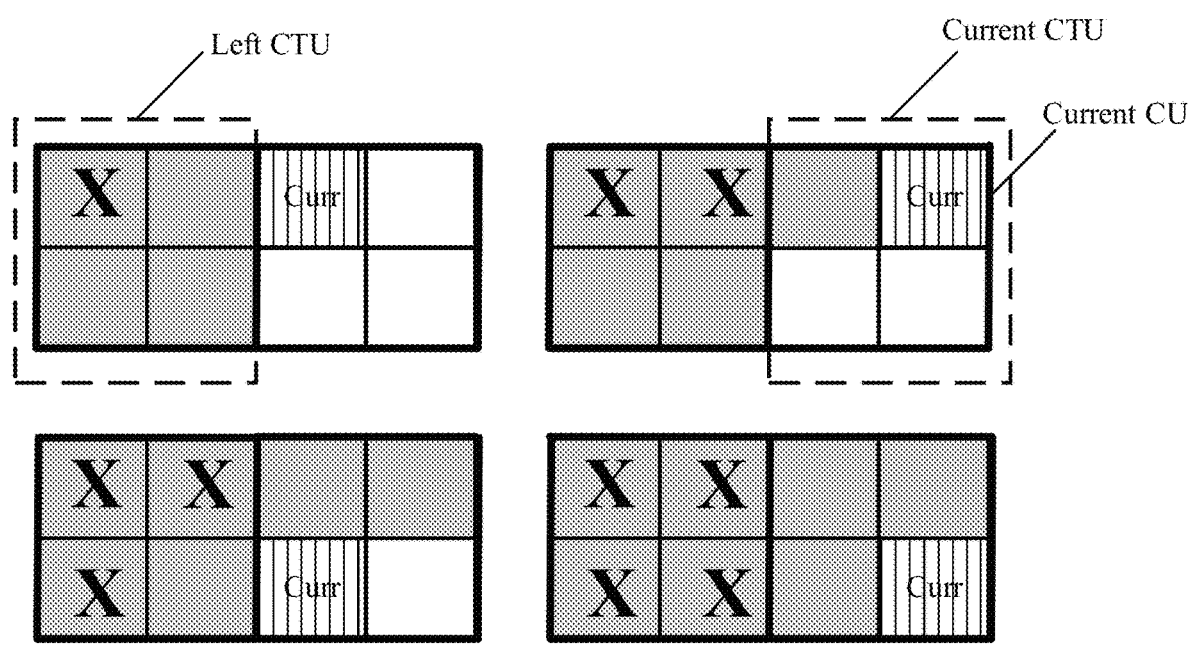
FIG. 7 is a schematic diagram of a searching range of a reference block of ISC in the related art.

In various embodiments of the present disclosure, to facilitate hardware implementation, during ISC, only a memory with a size of one CTU is used as a storage space. For example, it is assumed that the size of one CTU is 128*128 (that is, M=W=128, but is not limited in the present disclosure), ISC is limited to use only a memory with a size of 128*128. As shown in FIG. 7, a first part with a size of 64*64 in the memory of 128*128 is used for storing pixels in a current to-be-encoded CU (Curr shown in the figure) with a size of 64*64, and three second parts each with a size of 64*64 in the memory of 128*128 are used for storing encoded pixels in three encoded CUs each with a size of 64*64. Herein, the encoded CU is referred to as an encoded block. Therefore, during ISC, a reference string can be found in only the three encoded CUs each with the size of 64*64.

In various embodiments of the present disclosure, to facilitate hardware implementation, it is assumed that a size of one CTU is less than or equal to 64*64, ISC is limited to use only a memory with a size of 128*128 (that is, M=128). A first part with a size of 64*64 in the memory of 128*128 is used for storing pixels in a current to-be-encoded CTU with a size of 64*64, and three second parts each with a size of 64*64 in the memory of 128*128 are used for storing encoded pixels in three encoded CTUs each with a size of 64*64. Herein, the encoded CTU is referred to as an encoded block. Therefore, during ISC, a reference string can be found in only the three encoded CTUs each with the size of 64*64.

S630. Search the second part of the storage space for a reference string of the current string, obtain a predicted value of the current string according to the reference string, and encode the current string.

The encoded region of the current image is searched for a reference string of the current string, an SV between the current string and the reference string thereof is obtained, the SV and/or a string length being used for representing that a predicted value of a pixel in a current string is obtained by using a predetermined operation and according to a corresponding reference string, and a residual between a pixel value of the current string and the predicted value thereof may be encoded to reduce a quantity of bits, thereby improving the encoding efficiency. Similar processing may be performed on each image frame in the original video signal, to finally generate a bit stream, and the bit stream may be transmitted to a decoder of a decoder side.

According to the video encoding method provided this embodiment of the present disclosure, pixels in the current encoding block are stored by using a first part of a storage space with a size of M*W, and at least some encoded block in the encoded largest coding unit and the current largest coding unit are stored by using a second part of the storage space, M being a positive integer greater than or equal to W. In addition, it is limited that the second part of the storage space is searched for a reference string of the current string, so that hardware implementation of string prediction can be simplified.

The current ISC solution has a part that is not conductive to hardware implementation. For example, there are the following cases: a position of a reference string overlaps with a current to-be-reconstructed CU, causing dependency on reconstruction of a string. For example, it is assumed that one CU is divided into two strings, which are respectively referred to as a string 1 and a string 2, and for the string 2, reference is made to the string 1. In this case, the string 2 needs to wait for the string 1 to complete reconstruction before starting reconstruction.

In various embodiments of the present disclosure, the reference string may be set to meet the following conditions: the reference string is in a range of the current largest coding unit and N encoded largest coding units, the N encoded largest coding units being adjacent to a target side of the current largest coding unit, and N being a positive integer greater than or equal to 1; in a case that pixels in the reference string are in the N encoded largest coding units, pixels in a corresponding target region after the pixels in the reference string are shifted in a predetermined direction by a predetermined pixel have not been encoded; the pixels in the reference string are located within a boundary of an independent encoding region of the current image; and the pixels in the reference string do not overlap with an unencoded block of the current image.

In an exemplary embodiment, a value of N may be determined according to a size of the largest coding unit.

In an exemplary embodiment, in a case that a size of the largest coding unit is M*M, there are M predetermined pixels, and the target region is a corresponding $$\frac{M}{2} * \frac{M}{2}$$

region after the pixels in the reference string are shifted in the predetermined direction by the M pixels.

In an exemplary embodiment, in a case that a size of the largest coding unit is K*K, K being a positive integer less than M, there are N*K predetermined pixels, and the target region is a corresponding largest coding unit after the pixels in the reference string are shifted in the predetermined direction by the N*K pixels.

In an exemplary embodiment, minimum coordinates in the target region are not equal to minimum coordinates in the current encoding block. In various embodiments of this application, the target region may include at least one CU. When the target region includes a plurality of CUs, the current encoding block may be a first CU of the target region.

In an exemplary embodiment, the unencoded block includes the current encoding block, and the pixels in the reference string do not overlap with pixels in the current encoding block.

In an exemplary embodiment, horizontal coordinates of the pixels in the reference string are less than horizontal coordinates of the pixels in the current encoding block; or vertical coordinates of the pixels in the reference string are less than vertical coordinates of the pixels in the current encoding block.

In some embodiments, the unencoded block of the current image may include a current to-be-encoded CU and other unencoded CUs, that is, the reference string is not allowed to overlap with encoded pixels in the current CU. In this way, no dependency may exist between strings, so that the encoding complexity can be reduced and parallel encoding can be implemented.

In an exemplary embodiment, the unencoded block includes no current encoding block, the pixels in the reference string are allowed to overlap with encoded pixels in the current encoding block, and the pixels in the reference string do not overlap with unencoded pixels in the current encoding block.

In some embodiments, the unencoded block of the current image includes no current to-be-encoded CU, that is, the reference string is allowed to overlap with encoded pixels in the current CU. This case is referred to as inter string dependency. According to a scanning sequence, a string in the behind needs to wait for a previous string to complete encoding before performing encoding. However, the complexity of inter string dependence is smaller that of intra string dependency. In addition, correlation between a pixel closer to the current CU and a current to-be-encoded pixel in the current CU is stronger, and a better prediction effect can be obtained by using an adjacent pixel as a reference. Therefore, the performance of the inter string dependence is higher than that of no dependence. The intra string dependence refers to that a position of the reference string overlaps with the current CU and also overlaps with a position of the current to-be-encoded string. In this case, the string can be only encoded pixel by pixel according to the scanning sequence.

In an exemplary embodiment, the pixels in the reference string are allowed to overlap with encoded pixels in the current encoding block, and the pixels in the reference string do not overlap with encoded pixels in a row including unencoded pixels in the current encoding block.

In some embodiments, the pixels in the reference string are allowed to overlap with encoded pixels in the current encoding block but are not allowed to overlap with a row including unencoded pixels in the current encoding block (the row is a row in the current encoding block rather than a row in the current image). As described above, during hardware implementation, if there is no reference between strings, parallel encoding may be performed. For inter string reference, because there is a reference, parallel encoding cannot be performed on strings, and a current string needs to wait for a reference string to complete encoding before starting encoding. After the limiting condition is added, the reference string and the current string are not in a same row of the current encoding block, and encoding may be performed row by row without waiting.

In an exemplary embodiment, the independent encoding region of the current image includes the current image or a slice and a tile in the current image.

In an exemplary embodiment, in a case that a size of the largest coding unit is M*M, M being a positive integer greater than or equal to 1, pixels in the reference string are from a same $$\frac{M}{2} * \frac{M}{2}$$

aligned region.

In an exemplary embodiment, in a case that a size of the largest coding unit is not M*M, M being a positive integer greater than or equal to 1, pixels in the reference string are from a same largest coding unit.

In an exemplary embodiment, a bounding rectangle of the reference string does not overlap with an unencoded region of the current image.

The following describes how to limit the position of the reference string on the encoder side by using specific examples and according to the solutions provided in the foregoing embodiments.

To facilitate hardware implementation, on an encoder side, during ISC, only a memory with a size of one CTU is used. For example, it is assumed that the size of one CTU is 128*128 samples (in a video coding standard, "sample" may be used for expressing "pixel" and may include 128*128 luminance samples and corresponding chrominance samples), ISC is limited to use only a memory with a size of 128*128. A space with a size of 64*64 in the memory with the size of 128*128 is used for storing unencoded pixels in a current to-be-encoded CU of 64*64 (a CU of 64*64 marked as Curr in FIG. 7, which corresponds to a current CTU of 128*128), and three spaces each with a size of 64*64 may be used for storing encoded pixels in three encoded CUs in an encoded region of a current image. Therefore, during ISC, only the three encoded CUs each with the size of 64*64 can be searched for a reference string of a current string of the current CU. The following conditions are to be met.

(1) pixels in a reference string to which a string vector points shall not include pixels in the current CU.

For example, it is assumed that coordinates of a pixel in a reference string are (xRef_i, yRef_i), both Ref_i and yRef_i being integers greater than or equal to 0, and i=0, 1, 2, . . . , and L−1, L being a string length, and L being a positive integer greater than 1, and coordinates of an upper left corner of a current CU are (xCb, yCb), both xCb and yCb being integers greater than or equal to 0, the coordinates of the pixel in the reference string are to meet a condition that (xRef_i<xCb||yRef_i<yCb) is true, "∥" being "logical or", that is, in a coordinate system of the reference string, as shown in FIG. 7, the reference string is located on the left or above the current CU.

That the coordinates of the pixel in the reference string are to meet the condition that (xRef_i<xCb||yRef_i<yCb) is true is limited in a case that an encoding sequence is from left to right and from top to bottom. If an encoder/an encoding standard performs encoding in another sequence, the condition may be adjusted accordingly, which is not limited in the present disclosure. Similarly, in the following, all descriptions are made under the condition that the encoding sequence is from left to right and from top to bottom. Therefore, the upper left corner is minimum coordinates or a pixel corresponding to minimum coordinates, but the solution provided in the embodiments of the present disclosure is also applicable to other encoding sequences, which are not limited.

(2) the reference string to which the string vector points is limited in a range of a current CTU and N CTUs (which are encoded CTUs) on the left (it is assumed that in a reference coordinate system, a target side is a left side) of the current CTU, a value of N is determined by a size of a largest coding unit, for example, N may be determined according to the following formula:

$$N=(1<<((7-(\log 2\_lcu\_size\_minus2+2))<<1))-(((\log 2\_lcu\_size\_minus2+2)<7)?1:0) \quad (3)$$

In formula (3), a width or a height of the largest coding unit is recoded as lcu_size, lcu_size being a positive integer greater than or equal to 1, and log 2_lcu_size_minus2=log 2(lcu_size)−2. An operator "<<" represents left shifting and is used for shifting all binary bits of a number to the left by K bits (K being a positive integer greater than or equal to 1), a high bit is discarded, and 0 is added to a low bit. (((log 2_lcu_size_minus2+2)<7)?1:0) is a trinary operator. Whether ((log 2_lcu_size_minus2+2)<7) is valid is first determined, and if ((log 2_lcu_size_minus2+2)<7) is valid, (((log 2_lcu_size_minus2+2)<7)?1:0)=1. If ((log 2_lcu_size_minus2+2)<7) is not valid, (((log 2_lcu_size_minus2+2)<7)?1:0)=0.

For example, if a size of an LCU is 128*128, lcu_size=128, log 2(128)=7, log 2_lcu_size_minus2=5, and N=(1<<(0<<1))−0=1. As shown in FIG. 7, to reduce the memory and the calculation complexity on the encoder side and to facilitate hardware implementation, ISC allows that only the current CTU and the left CTUs adjacent to the left side of the current CTU are searched for the reference string of the current string in the current CU, each small block representing a region of 64*64.

In another example, if the size of the LCU is equal to 64*64, lcu_size=64, log 2(64)=6, log 2_lcu_size_minus2=4, and N=(1<<(1<<1))−1=3. The value of N is equivalent to dividing the memory of 128*128 into four parts, one part is used for storing pixels of a current LCU, and other parts are used for storing pixels of N−1 LCUs on the left of the current LCU in a same row. The formula is also applicable to a smaller LCU.

Alternatively, N may be determined according to the following formula:

$$N=(1<<((7-\log 2\_lcu\_size)<<1))-(((\log 2\_lcu\_size)<7)?1:0) \quad (4)$$

In formula (4), log 2_lcu_size=log 2(lcu_size). Whether ((log 2_lcu_size)<7) is valid is first determined, and if ((log 2_lcu_size)<7) is valid, (((log 2_lcu_size)<7)?1:0)=1. If ((log 2_lcu_size)<7) is not valid, (((log 2_lcu_size<7)?1:0)=0.

(3) When the pixels in the reference string to which the string vector points fall within a largest coding unit (which is an encoded CTU) adjacent to the left side of the current CTU, and a size of the largest coding unit is 128*128, the following limiting conditions are to be met:

(3.1) An upper left corner in a 64*64 region (a target region) after the pixels in the reference string are shifted to the right (a predetermined direction) by 128 pixels (predetermined pixels) has not been encoded.

(3.2) Coordinates of the upper left corner in the 64*64 region after the pixels in the reference string are shifted to the right by 128 pixels are not to be the same as the coordinates of the upper left corner of the current CU.

For example, it is assumed that a position of a luminance component of a pixel in a reference string is (xRefTL, yRefTL), both xRefTL and yRefTL being integers greater than or equal to 0, (((xRefTL+128)/64)*64, (yRefTL/64) *64) cannot be obtained, that is, the encoded pixel cannot be found from the memory that is configured to store the encoded pixels in the three encoded CUs each with the size of 64*64, so that (((xRefTL+128)/64)*64, (yRefTL/64)*64) is not to be equal to the coordinates (xCb, yCb) of the upper left corner of the current CU. Herein, the division is rounding down, for example, the above (((xRefTL+128)/64)*64, (yRefTL/64)*64) may be represented by (floor((xRefTL+128)/64)*64, floor(yRefTL/64)*64), wherein floor(x) is a floor function outputting the greatest integer less than or equal to x.

Considering a processing capability of a hardware design pipeline, a consensus-reached mainstream processing unit in the related art can process an image region with a size of 64*64. Therefore, during standard formulation, some encoding elements uses the 64*64 processing capability as an upper limit, for example, a maximum value of a transform unit.

As shown in FIG. 7, the position of the current CU in the current CTU may be divided into four conditions:

As shown in the figure at an upper left corner in FIG. 7, if a current CU is a block of 64*64 at an upper left corner of a current CTU, a block of 64*64 at a lower right corner, a block of 64*64 at a lower left corner, and a block of 64*64 at an upper right corner of a left CTU may be used as references for the current CU.

As shown in the figure at an upper right corner in FIG. 7, if a current CU is a block of 64*64 at an upper right corner of a current CTU, in addition to an encoded part of the current CTU, if a position (0, 64) relative to the current CTU is not encoded, for the current CU, reference can also be made to a block of 64*64 at a lower right corner of a left CTU and a block of 64*64 at a lower left corner of the left CTU.

As shown in the figure at a lower left corner in FIG. 7, if a current CU is a block of 64*64 at a lower left corner of a current CTU, in addition to an encoded part of the current CTU, for the current CU, reference can also be made to a block of 64*64 at a lower right corner of a left CTU.

As shown in the figure at a lower right corner in FIG. 7, if a current CU is a block of 64*64 at a lower right corner of a current CTU, for the current CU, reference can be made to only an encoded part of the current CTU.

(4) When the pixels in the reference string to which the string vector points fall with a largest coding unit (which is an encoded CTU) adjacent to the left side of the current CTU, and a size of the largest coding unit is less than or equal to 64*64, the following limiting conditions are to be met:

(4.1) An upper left corner of a CTU region after the pixels in the reference string are shifted to the right by N*lcu_size pixels has not been encoded.

(4.2) Coordinates of the upper left corner of the CTU region after the pixels in the reference string are shifted to the right by the N*lcu_size pixels are not to be the same as the coordinates of the upper left corner of the current CU.

For example, it is assumed that a position of a luminance component of a pixel in a reference string is (xRefTL, yRefTL), and (((xRefTL+lcu_size*N)/lcu_size)*lcu_size, yRefTL/lcu_size)*lcu_size) cannot be obtained, so that (((xRefTL+lcu_size*N)/lcu_size)*lcu_size, (yRefTL/lcu_size)*lcu_size) is not to be equal to the coordinates (xCb, yCb) of the upper left corner of the current CU.

The step (3) gives a limitation when the largest coding unit is 128*128, and the step (4) gives a limitation when the size of the largest coding unit is less than or equal to 64*64, so that the memory of 128*128 can be fully utilized during encoding.

All the example descriptions are made by using an example in which the size of the memory is 128*128. During encoding, a size of an LCU may be designed by using a parameter. However, for a hardware design, if the memory of 128*128 has been designed, the memory is to be fully utilized when the LCU is less than 128*128.

(5) For a CTU with a size of 128*128, all the pixels in the reference string to which the string vector points can be from only a same 64*64 aligned region, that is, all sample positions in the reference string are required to be limited in a same 64*64 aligned reference pixel region. A figure at a lower right corner in FIG. 7 is used as an example, a left CTU of 128*128 is divided into four CUs of 64*64, and all pixels in the reference string cannot span boundaries of the CUs of 64*64.

For a CTU without a size of 128*128, all the pixels in the reference string are from a same CTU, that is, the reference string cannot span a boundary of the CTU. This limitation reduces a quantity of times of memory being accessed. When the encoder side performs ISC prediction, only one memory space with a size of 64*64 needs to be accessed.

(6) A position of the reference string to which the string vector points is not to beyond a boundary of an independent encoding region such as an image, a slice, or a tile. A slice is a concept in AVS3, the slice is a rectangular region in an image and includes parts of a plurality of largest coding units in the image, and slices are not to overlap. A tile is a concept in HEVC.

(7) Any reference string sample at a position of the reference string to which the string vector points is not to overlap with an unencoded region or a current encoding beyond block region (that is, the current CU).

(8) Optionally, a bounding rectangle of any reference string sample at the position of the reference string to which the string vector points is not to overlap with an unencoded region or a current encoding encoding block region. This is a simplified manner of determining whether the position of the reference string meets the limitation by making reference to the four corner points of the bounding rectangle of the reference string. If the bounding rectangle does not overlap with the unencoded region or the current encoding encoding block region, it indicates that the reference string also meets the limitation of not overlapping with the unencoded region or the current encoding encoding block region.

According to the solution provided in the embodiments of the present disclosure, a series of simplifications are made to the ISC solution, including the limitation on the position of the reference string. The methods simplify the hardware implementation of ISC. On one hand, after the position of the reference string is limited, there is no dependency between the strings, and the strings can be encoded in parallel. On the other hand, it may be further limited that the reference string is used in only a memory region with a size of 128*128.

The current ISC solution also has another part that is not conductive to hardware implementation. For example, only on the encoder side, it is limited that a sum of a quantity of strings and a quantity of isolated points (unmatched pixels) is not greater than ¼ of a quantity of CU pixels. This results in a relatively large quantity of strings, and thus a relatively large quantity of syntax elements require to be encoded.

The following describes how to limit a quantity of strings and a quantity of unmatched pixels on the encoder side by using specific examples.

It is assumed that a quantity of encoded strings in a current CU is N1, and a quantity of unmatched pixels is N2, both N1 and N2 being integers greater than or equal to 0. The following manners may be used alone or in any combination.

(A) It is limited that N1+N2 is less than or equal to a first quantity threshold T1. T1 may be an integer in [1, W*H], W is a width of the current CU, H is a height of the current CU, and both W and H are positive integers greater than or equal to 1. In this embodiment, to prevent an encoding block from being divided too finely, resulting in the increasingly high complexity, the value range of T1 is limited to be less than or equal to a quarter of W*H. In addition, T1 is preferably 4 according to an experimental result. The encoder side has the following optional manners:

i. When N1+N2 is equal to T1−1, and if a quantity NR (NR is an integer greater than or equal to 0) of remaining pixels in the current CU is equal to 1, there is no need to determine a type of a next remaining pixel by encoding "sp_is_matched_flag", that is, by encoding a matched flag, and the remaining pixel may be directly determined as an unmatched pixel.

ii. When N1+N2 is equal to T1−1, and if the quantity NR of remaining pixels in the current CU is greater than 1, there is no need to determine the type of the next remaining pixel by encoding "sp_is_matched_flag", that is, by encoding a matched flag, and the remaining pixel may be directly determined as a string, and a string length is NR.

iii. There is another manner of step ii, when N1+N2 is equal to T1−1, and if the quantity NR of remaining pixels in the current CU is greater than 1, "sp_is_matched_flag" is encoded, and if the remaining pixel is a string, "sp_is_matched_flag" is encoded as a first value such as 1 (but which is not limited in the present disclosure and may be limited according to an actual situation), and the string length is NR.

(B) It is limited that N1 is less than or equal to a second quantity threshold T2. T2 may be an integer in [1, W*H]. There are the following optional manners:

i. If N1 is equal to T2−1, and a next remaining pixel is determined as a starting point of a string, "sp_is_matched_flag" is encoded as a second value (it is assumed to be 1 herein, but is not limited in the present disclosure and may be limited according to an actual situation), indicating that the remaining pixels in the current CU are a string.

ii. If N1 is equal to T2−1, the remaining pixels are directly determined as a string.

iii. If N1 is equal to T2, the remaining pixels are directly determined as unmatched pixels.

(C) It is limited that N2 is less than or equal to a third quantity threshold T3. T3 may be an integer in [1, W*H]. There are the following optional manners:

i. if N2 is equal to T3, without encoding "sp_is_matched_flag" and a string length, remaining pixels of the current CU are directly used as a string.

ii. If N2 is equal to T3, without encoding "sp_is_matched_flag", all types of the remaining pixels of the current CU are directly determined as strings and a string length of each string is encoded.

(D) It is limited that N1+N2 is greater than or equal to a fourth quantity threshold T4. T4 may be an integer in [1, W*H]. In this embodiment, T4 is preferably a positive integer greater than 2. Herein, N1+N2 is limited to be greater than or equal to T4 with a consideration of more than one string during common string prediction, and this limitation can reduce encoding of syntax elements. There are the following optional manners:

i. If N1+N2 is less than T4, and "sp_is_matched_flag" is encoded as a third value such as 1 (but is not limited in the present disclosure and may be limited according to an actual situation) for determining that a next remaining pixel is a starting point of a string, it may be directly determined that the string is not the last string without encoding "sp_last_len_flag", thereby improving the encoding efficiency.

(E) It is limited that N1 is greater than or equal to a fourth quantity threshold T4. Herein, N1 is limited to be greater than or equal to T4 with a consideration of more than one string during common string prediction, and this limitation can reduce encoding of syntax elements. There are the following optional manners:

i. If N1 is less than T4, it may be directly determined that the string is not the last string without encoding "sp_last_len_flag".

According to the solution provided in the embodiments of the present disclosure, a series of simplifications are made to the ISC solution, including the limitation on the position of the reference string and the limitation on the quantity of strings. The methods simplify the hardware implementation of ISC.

(1) After the position of the reference string is limited, there is no dependency between the strings, and the strings can be encoded in parallel. In addition, similar to ISC, it may be further limited that the reference string is used in only a memory region with a size of 128*128.

(2) The limitation on the quantity of strings can reduce the quantity of strings and reduce the quantity of times of memory being accessed. On the other hand, the encoding of some syntax elements can be reduced, and the encoding performance can be improved.

The current ISC solution further has another part that is not conductive to hardware implementation, for example, a small block with a size of 4*4 is allowed to use string prediction. Because a string length of a string in the small block is relatively small, and the small block can bring relatively small performance.

The following describes how to limit a size of a block that performs string prediction on the encoder side by using specific examples.

Some blocks with a size are limited to not use string prediction. It is assumed that a width of a current CU is W, a height is H, and an area S=W*H. There are the following optional methods:

(1) If the area S of the current CU is less than or equal to a preset first area threshold T11, the current CU does not use string prediction by default without encoding "sp_flag", that is, a string prediction flag. A value of T11 is related to a size of a block allowed by the encoder, and the value of the size of the block may be an integer in a size range (a minimum size*a minimum size, a maximum size*a maximum size) of the block allowed by the encoder.

For example, in AVS3, T11 may be an integer in (4*4, 64*64). On the encoder side, the T11 may be selected based on the encoding performance and the complexity.

(2) If the width W of the current CU is less than or equal to a preset first width threshold T21, the current CU does not use string prediction by default without encoding "sp_flag". A value of T21 is related to a size of a block allowed by the encoder, and the value may be an integer in a size range (a minimum size, a maximum size) of the block allowed by the encoder.

For example, in AVS3, T21 may be an integer in (4, 64). On the encoder side, the T21 may be selected based on the encoding performance and the complexity.

(3) If the height H of the current CU is less than or equal to a preset first height threshold T31, the current CU does not use string prediction by default without encoding "sp_flag". A value of T31 is related to a size of a block allowed by the encoder, and the value may be an integer in a size range (a minimum size, a maximum size) of the block allowed by the encoder.

For example, in AVS3, T31 may be an integer in (4, 64). On the encoder side, the T31 may be selected based on the encoding performance and the complexity.

(4) If the area S of the current CU is greater than or equal to a preset second area threshold T41, the current CU does not use string prediction by default without encoding "sp_flag". A value of T41 is related to a size of a block allowed by the encoder, and the value may be an integer in a size range (a minimum size*a minimum size, a maximum size*a maximum size) of the block allowed by the encoder.

For example, in AVS3, T41 may be an integer in (4*4, 64*64). On the encoder side, the T41 may be selected based on the encoding performance and the complexity.

(5) If the width W of the current CU is greater than or equal to a preset second width threshold T51, the current CU does not use string prediction by default without encoding "sp_flag". A value of T51 is related to a size of a block allowed by the encoder, and the value may be an integer in a size range (a minimum size, a maximum size) of the block allowed by the encoder.

For example, in AVS3, T51 may be an integer in (4, 64). On the encoder side, the T51 may be selected based on the encoding performance and the complexity.

(6) If the height H of the current CU is greater than or equal to a preset second height threshold T61, the current CU does not use string prediction by default without encoding "sp_flag". A value of T61 is related to a size of a block allowed by the encoder, and the value may be an integer in a size range (a minimum size, a maximum size) of the block allowed by the encoder.

For example, in AVS3, T61 may be an integer in (4, 64). On the encoder side, the T61 may be selected based on the encoding performance and the complexity.

In steps (4) to (6), the use of string prediction by a large block is limited because the performance improvement brought by the use of string prediction by the large block is small. On one hand, this limitation can reduce the encoding of syntax elements, and on the other hand, string prediction analysis on the block with the size performed by the encoder side may be skipped.

(7) The methods may be used in combination. Some specific examples are provided below.

(1) a block with a width of 4 and a height of 4 does not use string matching by default without encoding "sp_flag"; or (2) a block with a width of 4 or a height of 4 does not use string matching by default without encoding "sp_flag"; or (3) a block with an area being less than or equal to 32 does not use string matching without encoding "sp_flag".

According to the solution provided in the embodiments of the present disclosure, a series of simplifications are made to the ISC solution, including the limitation on the position of the reference string, the limitation on the quantity of strings, and the limitation on the size of the block. The methods simplify the hardware implementation of ISC.

(1) After the position of the reference string is limited, there is no dependency between the strings, and the strings can be encoded in parallel. In addition, similar to ISC, it may be further limited that the reference string is used in only a memory region with a size of 128*128.

(2) The limitation on the quantity of strings can reduce the quantity of strings and reduce the quantity of times of memory being accessed. On the other hand, the encoding of some syntax elements can be reduced, and the encoding performance can be improved.

(3) The limitation on the size of the block may reduce a quantity of small strings, which is conductive to reducing a quantity of times of memory being accessed. On the other hand, the encoder side may skip string prediction analysis on some blocks with sizes (for example, a block with a size of 4*4), to reduce the complexity. In addition, the encoding of string prediction flags on some blocks may be reduced, thereby improving the encoding performance.

Figure 8:
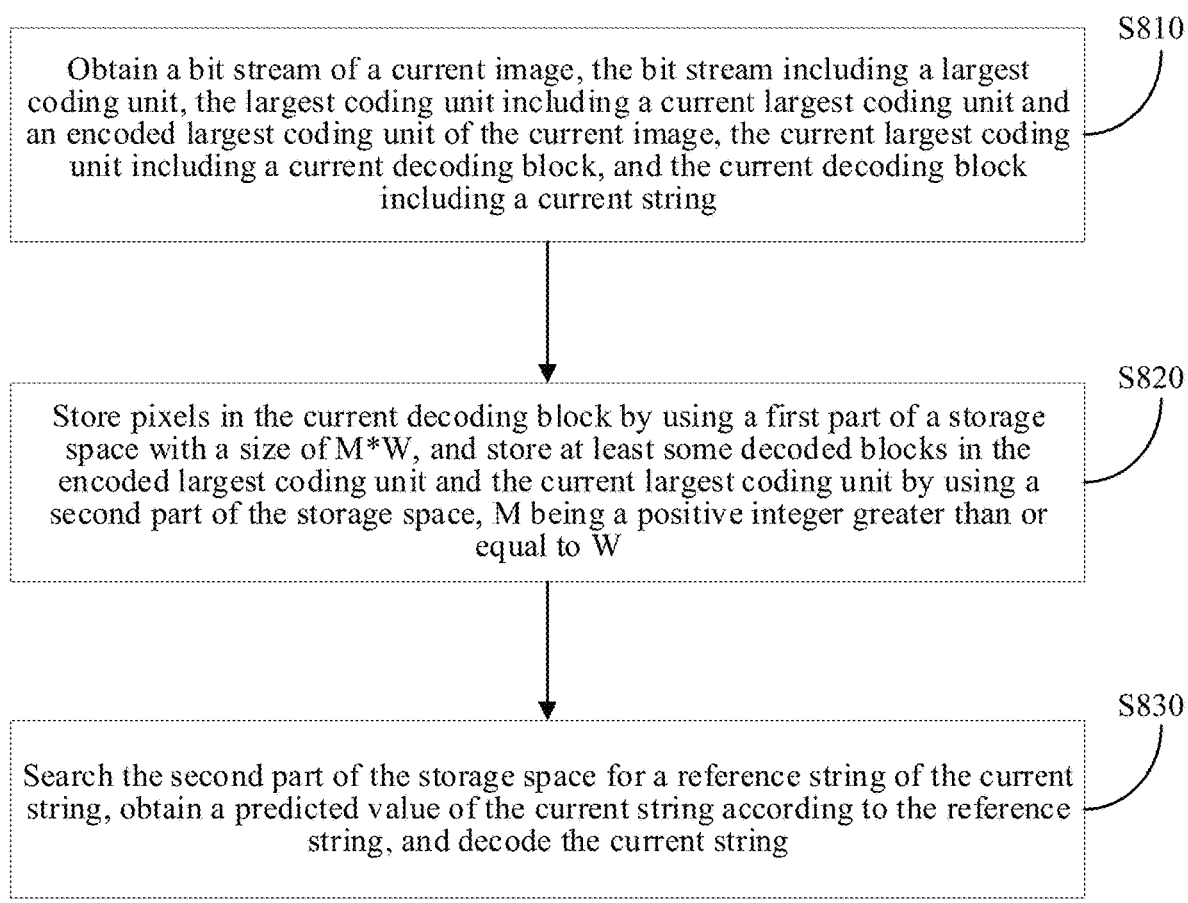
FIG. 8 is a schematic diagram of a video decoding method according to an embodiment of the present disclosure.

FIG. 8 is a schematic diagram of a video decoding method according to an embodiment of the present disclosure. The methods involved in the embodiments of the present disclosure may be used alone or may be used in combination together. An embodiment in FIG. 8 is described by using a decoder side as an example. The decoder side described herein may be a video decompression device deployed with a video decoder. The video decompression device includes a device of a terminal device, a server, or the like with a function of implementing the video decoder.

As shown in FIG. 8, the method provided in various embodiments of the present disclosure may include the following steps.

S810. Obtain a bit stream of a current image, the bit stream including a largest coding unit, the largest coding unit including a current largest coding unit and an encoded largest coding unit that correspond to the current image, the current largest coding unit including a current decoding block, and the current decoding block including a current string.

In the following embodiments, an example in which a current decoding block is a current CU is used for description, but is not limited in the present disclosure.

S820. Store pixels in the current decoding block by using a first part of a storage space with a size of M*W, and store at least some decoded blocks in the encoded largest coding unit and the current largest coding unit by using a second part of the storage space, M being a positive integer greater than or equal to W.

S830. Search the second part of the storage space for a reference string of the current string, obtain a predicted value of the current string according to the reference string, and decode the current string.

In various embodiments of the present disclosure, the reference string may be set to meet the following conditions: the reference string is in a range of the current largest coding unit and N encoded largest coding units, the N encoded largest coding units being adjacent to a target side of the current largest coding unit, and N being a positive integer greater than or equal to 1; in a case that pixels in the reference string are in the N encoded largest coding units, pixels in a corresponding target region after the pixels in the reference string are shifted in a predetermined direction by a predetermined pixel have not been reconstructed; the pixels in the reference string are located within a boundary of an independent decoding region of the current image; and the pixels in the reference string do not overlap with an undecoded block of the current image.

In an exemplary embodiment, a value of N is determined according to a size of the largest coding unit.

In an exemplary embodiment, in a case that a size of the largest coding unit is M*M, there are M predetermined pixels, and the target region is a corresponding $$\frac{M}{2} * \frac{M}{2}$$

region after the pixels in the reference string are shifted in the predetermined direction by the M pixels.

In an exemplary embodiment, in a case that a size of the largest coding unit is K*K, K being a positive integer less than M, there are N*K predetermined pixels, and the target region is a corresponding largest coding unit after the pixels in the reference string are shifted in the predetermined direction by the N*K pixels.

In an exemplary embodiment, minimum coordinates in the target region are not equal to minimum coordinates in the current decoding block. In various embodiments of the present disclosure, the target region may include at least one CU. When the target region includes a plurality of CUs, the current decoding block may be a first CU of the target region.

In an exemplary embodiment, the undecoded block may include the current decoding block, and the pixels in the reference string do not overlap with pixels in the current decoding block.

In an exemplary embodiment, horizontal coordinates of the pixels in the reference string are less than horizontal coordinates of the pixels in the current decoding block; or vertical coordinates of the pixels in the reference string are less than vertical coordinates of the pixels in the current decoding block.

In an exemplary embodiment, the undecoded block may include no current decoding block, the pixels in the reference string are allowed to overlap with reconstructed pixels in the current decoding block, and the pixels in the reference string do not overlap with unreconstructed pixels in the current decoding block.

In various embodiments in the present disclosure, an unreconstructed pixel may be referred as an undecoded pixel, which is a pixel that has not been reconstructed (or decoded) yet during a decoding process; and/or an unreconstructed block/unit may be referred as an undecoded block/unit, which is a block/unit that has not been reconstructed (or decoded) yet during a decoding process.

In various embodiments in the present disclosure, a reconstructed pixel may be referred as a decoded pixel, which is a pixel that has been reconstructed (or decoded) already during a decoding process; and/or a reconstructed block/unit may be referred as a decoded block/unit, which is a block/unit that has been reconstructed (or decoded) already during a decoding process.

In some embodiments, the undecoded block of the current image may include a current to-be-decoded CU and other undecoded CUs, that is, the reference string is not allowed to overlap with reconstructed pixels in the current CU. In this way, no dependency may exist between strings, so that the complexity of decoding can be reduced and parallel decoding can be implemented.

In an exemplary embodiment, the undecoded block includes no current decoding block, and the pixels in the reference string are allowed to overlap with reconstructed pixels in the current decoding block.

In some embodiments, the undecoded block of the current image includes no current to-be-decoded CU, that is, the reference string is allowed to overlap with reconstructed pixels in the current CU. This case is referred to as inter string dependency. According to a scanning sequence, a string in the behind needs to wait for a previous string to complete decoding before performing decoding. However, the complexity of inter string dependence is smaller that of intra string dependency. In addition, correlation between a pixel closer to the current CU and a current to-be-decoded pixel in the current CU is stronger, and a better prediction effect can be obtained by using an adjacent pixel as a reference. Therefore, the performance of the inter string dependence is higher than that of no dependence. The intra string dependence refers to that a position of the reference string overlaps with the current CU and also overlaps with a position of the current to-be-decoded string. In this case, the string can be only encoded pixel by pixel according to the scanning sequence.

In an exemplary embodiment, the pixels in the reference string are allowed to overlap with reconstructed pixels in the current decoding block, and the pixels in the reference string do not overlap with reconstructed pixels in a row including unreconstructed pixels in the current decoding block.

In some embodiments, the pixels in the reference string are allowed to overlap with reconstructed pixels in the current decoding block but are not allowed to overlap with a row including unreconstructed pixels in the current decoding block (the row is a row in the current decoding block rather than a row in the current image). As described above, during hardware implementation, if there is no reference between strings, parallel reconstruction may be performed. For inter string reference, because there is a reference, parallel decoding cannot be performed on strings, and a current string needs to wait for a reference string to complete decoding before starting decoding. After the limiting condition is added, the reference string and the current string are not in a same row of the current decoding block, and reconstruction may be performed row by row without waiting.

In an exemplary embodiment, an independent decoding region of the current image includes the current image or a slice and a tile in the current image.

In an exemplary embodiment, in a case that a size of the largest coding unit is M*M, M being a positive integer greater than or equal to 1, pixels in the reference string are from a same $$\frac{M}{2} * \frac{M}{2}$$

aligned region.

In an exemplary embodiment, in a case that a size of the largest coding unit is not M*M, M being a positive integer greater than or equal to 1, pixels in the reference string are from a same largest coding unit.

In an exemplary embodiment, a bounding rectangle of the reference string does not overlap with an undecoded block of the current image.

The following describes how to limit the position of the reference string on the decoder side by using specific examples and according to the solutions provided in the foregoing embodiments.

To facilitate hardware implementation, on a decoder side, during ISC, only a memory with a size of one CTU is used. For example, it is assumed that the size of one CTU is 128*128, the ISC is limited to use only a memory with a size of 128*128. A space with a size of 64*64 in the memory with the size of 128*128 is used for storing unreconstructed pixels in a current to-be-reconstructed CU with a size of 64*64, and three spaces each with a size of 64*64 may be used for storing reconstructed pixels in three decoded CUs in a decoded region of a current image. Therefore, during ISC, only the three decoded CUs each with the size of 64*64 can be searched for a reference string of a current string of the current CU. The following conditions are to be met.

(1) pixels in a reference string to which a string vector points shall not include pixels in the current CU.

For example, it is assumed that coordinates of a pixel in a reference string are (xRef_i, yRef_i), both Ref_i and yRef_i being integers greater than or equal to 0, and i=0, 1, 2, . . . , and L−1, L being a string length, and L being a positive integer greater than 1, and coordinates of an upper left corner of a current CU are (xCb, yCb), both xCb and yCb being integers greater than or equal to 0, the coordinates of the pixel in the reference string are to meet a condition that (xRef_i<xCb∥yRef_i<yCb) is true, "∥" being "logical or", that is, in a coordinate system of the reference string, the reference string is located on the left or above the current CU.

That the coordinates of the pixel in the reference string are to meet the condition that (xRef_i<xCb∥yRef_i<yCb) is true is limited in a case that a decoding sequence is from left to right and from top to bottom. If a decoder/a decoding standard performs decoding in another sequence, the condition may be adjusted accordingly, which is not limited in the present disclosure. Similarly, in the following, all descriptions are made under the condition that the decoding sequence is from left to right and from top to bottom. Therefore, the upper left corner is minimum coordinates or a pixel corresponding to minimum coordinates, but the solution provided in the embodiments of the present disclosure is also applicable to other decoding sequences, which are not limited.

(2) the reference string to which the string vector points is limited in a range of a current CTU and N CTUs (which are encoded CTUs) on the left (it is assumed that in a reference coordinate system, a target side is a left side) of the current CTU, a value of N is determined by a size of a largest coding unit, for example, N may be determined according to the foregoing formula (3) or (4).

(3) When the pixels in the reference string to which the string vector points fall within a largest coding unit (which is an encoded CTU) adjacent to the left side of the current CTU, and a size of the largest coding unit is 128*128, the following limiting conditions are to be met:

(3.1) An upper left corner in a 64*64 region after the pixels in the reference string are shifted to the right by 128 pixels has not been reconstructed.

(3.2) Coordinates of the upper left corner in the 64*64 region after the pixels in the reference string are shifted to the right by 128 pixels are not to be the same as the coordinates of the upper left corner of the current CU.

For example, it is assumed that a position of a luminance component of a pixel in a reference string is (xRefTL, yRefTL), and (((xRefTL+128)/64)*64, (yRefTL/64)*64) cannot be obtained, that is, the reconstructed pixel cannot be found from the memory that is configured to store the reconstructed pixels in the three reconstructed CUs each with the size of 64*64, so that (((xRefTL+128)/64)*64, (yRefTL/64)*64) is not to be equal to the coordinates (xCb, yCb) of the upper left corner of the current CU. Herein, the division is rounding down.

(4) When the pixels in the reference string to which the string vector points fall with a largest coding unit (which is an encoded CTU) adjacent to the left side of the current CTU, and a size of the largest coding unit is less than or equal to 64*64, the following limiting conditions are to be met:

(4.1) An upper left corner of a CTU region after the pixels in the reference string are shifted to the right by N*lcu_size pixels has not been reconstructed.

(4.2) Coordinates of the upper left corner of the CTU region after the pixels in the reference string are shifted to the right by the N*lcu_size pixels are not to be the same as the coordinates of the upper left corner of the current CU.

For example, it is assumed that a position of a luminance component of a pixel in a reference string is (xRefTL, yRefTL), and (((xRefTL+lcu_size*N)/lcu_size)*lcu_size, yRefTL/lcu_size)*lcu_size) cannot be obtained, so that (((xRefTL+lcu_size*N)/lcu_size)*lcu_size, (yRefTL/lcu_size)*lcu_size) is not to be equal to the coordinates (xCb, yCb) of the upper left corner of the current CU.

The step (3) gives a limitation when the largest coding unit is 128*128, and the step (4) gives a limitation when the size of the largest coding unit is less than or equal to 64*64, so that the memory of 128*128 can be fully utilized during decoding.

(5) For a CTU with a size of 128*128, all the pixels in the reference string to which the string vector points can be from only a same 64*64 aligned region. For a CTU without a size of 128*128, all the pixels in the reference string are from a same CTU, that is, the reference string cannot span a boundary of the CTU. This limitation reduces a quantity of times of memory being accessed. When the decoder side performs ISC prediction, only one memory space with a size of 64*64 needs to be accessed.

(6) A position of the reference string to which the string vector points is not to beyond a boundary of an independent decoding region such as an image, a slice, or a tile.

(7) Any reference string sample at a position of the reference string to which the string vector points is not to overlap with an unreconstructed region or a current reconstructing decoding block region.

(8) Optionally, a bounding rectangle of any reference string sample at the position of the reference string to which the string vector points is not to overlap with an unreconstructed region or a current reconstructing decoding block region. This is a simplified manner of determining whether the position of the reference string meets the limitation by making reference to the four corner points of the bounding rectangle of the reference string. If the bounding rectangle does not overlap with the unreconstructed region or the current reconstructing decoding block region, it indicates that the reference string also meets the limitation of not overlapping with the unreconstructed region or the current reconstructing decoding block region.

According to the solution provided in the embodiments of the present disclosure, a series of simplifications are made to the ISC solution, including the limitation on the position of the reference string. The methods simplify the hardware implementation of ISC. On one hand, after the position of the reference string is limited, there is no dependency between the strings, and the strings can be reconstructed in parallel. On the other hand, similar to ISC, it may be further limited that the reference string is used in only a memory region with a size of 128*128.

The following describes how to limit a quantity of strings and a quantity of unmatched pixels on the decoder side by using specific examples.

A limitation on a maximum quantity of strings: It is assumed that a quantity of decoded strings in a current block is N1, and a quantity of unmatched pixels is N2, both N1 and N2 being integers greater than or equal to 0. The following manners may be used alone or in any combination.

(A) It is limited that N1+N2 is less than or equal to a first quantity threshold T1. T1 may be an integer in [1, W*H], W is a width of the current CU, H is a height of the current CU, and both W and H are positive integers greater than or equal to 1. In this embodiment, to prevent a decoding block from being divided too finely, resulting in the increasingly high complexity, the value range of T1 is limited to be less than or equal to a quarter of W*H. In addition, T1 is preferably 4 according to an experimental result. The decoder side has the following optional manners:

i. When N1+N2 is equal to T1-1, and if a quantity NR (NR is an integer greater than or equal to 0) of remaining pixels in the current CU is equal to 1, there is no need to determine a type of a next remaining pixel by decoding "sp_is_matched_flag", that is, by decoding a matched flag, and the remaining pixel may be directly determined as an unmatched pixel.

ii. When N1+N2 is equal to T1-1, and if the quantity NR of remaining pixels in the current CU is greater than 1, there is no need to determine the type of the next remaining pixel by decoding "sp_is_matched_flag", that is, by decoding a matched flag, and the remaining pixel may be directly determined as a string, and a string length is NR.

iii. There is another manner of step ii, when N1+N2 is equal to T1-1, and if the quantity NR of remaining pixels in the current CU is greater than 1, "sp_is_matched_flag" is decoded, and if the remaining pixel is a string, "sp_is_matched_flag" is decoded as a first value such as 1 (but which is not limited in the present disclosure and may be limited according to an actual situation), the remaining pixels of the current CU are directly determined as a string and the string length is NR.

(B) It is limited that N1 is less than or equal to a second quantity threshold T2. T2 may be an integer in [1, W*H]. There are the following optional manners:

i. If N1 is equal to T2-1, and "sp_is_matched_flag" is decoded as a second value such as 1 (but is not limited in the present disclosure and may be limited according to an actual situation), a next remaining pixel is determined as a starting point of a string, and the remaining pixel of the current CU is directly determined as a string.

ii. if N1 is equal to T2-1, without decoding "sp_is_matched_flag", the remaining pixels of the current CU are directly determined as a string.

ii. If N1 is equal to T2, without decoding "sp_is_matched_ flag", the remaining pixels in the current CU are directly determined as unmatched pixels.

(C) It is limited that N2 is less than or equal to a third quantity threshold T3. T3 may be an integer in [1, W*H]. There are the following optional manners:

i. If N2 is equal to T3, without decoding "sp_is_matched_ flag" and a string length, the remaining pixels of the current CU are directly used as a string.

ii. If N2 is equal to T3, without decoding "sp_is_ matched_ flag", all types of the remaining pixels of the current CU are directly determined as strings and a string length of each string is decoded.

(D) It is limited that N1+N2 is greater than or equal to a fourth quantity threshold T4. T4 may be an integer in [1, W*H]. In this embodiment, T4 is preferably a positive integer greater than 2. Herein, N1+N2 is limited to be greater than or equal to T4 with a consideration of more than one string during common string prediction, and this limitation can reduce decoding of syntax elements. The decoder side has the following optional manners:

i. If N1+N2 is less than T4, and a next remaining pixel is determined as a starting point of a string by decoding "sp_is_matched_flag", for example, if "p_is_matched_ flag" is decoded as a third value such as 1 (but is not limited in the present disclosure and may be limited according to an actual situation). In this case, it may be directly determined that the string is not the last string without decoding "sp_last_len_flag", thereby improving the decoding efficiency.

(E) It is limited that N1 is greater than or equal to a fourth quantity threshold T4. Herein, N1 is limited to be greater than or equal to T4 with a consideration of more than one string during common string prediction, and this limitation can reduce decoding of syntax elements. There are the following optional manners:

i. If N1 is less than T4, it may be directly determined that the string is not the last string without decoding "sp_last_len_flag".

According to the solution provided in the embodiments of the present disclosure, a series of simplifications are made to the ISC solution, including the limitation on the position of the reference string and the limitation on the quantity of strings. The methods simplify the hardware implementation of ISC.

(1) After the position of the reference string is limited, there is no dependency between the strings, and the strings can be reconstructed in parallel. In addition, similar to ISC, it may be further limited that the reference string is used in only a memory region with a size of 128*128.

(2) The limitation on the quantity of strings can reduce the quantity of strings and reduce the quantity of times of memory being accessed. On the other hand, the decoding of some syntax elements can be reduced, and the decoding performance can be improved.

The following describes how to limit a size of a block that performs string prediction on the decoder side by using specific examples.

Some blocks with a size are limited to not use string prediction. It is assumed that a width of a current CU is W, a height is H, and an area S=W*H. There are the following optional methods:

(1) If the area S of the current CU is less than or equal to a preset first area threshold T11, the current CU does not use string prediction by default without decoding "sp_flag", that is, a string prediction flag. A value of T11 is related to a size of a block allowed by the decoder, and the value may be an integer in a size range (a minimum size*a minimum size, a maximum size*a maximum size) of the block allowed by the decoder.

For example, in AVS3, T11 may be an integer in (4*4, 64*64). The T11 may be selected based on the decoding performance and the complexity.

(2) If the width W of the current CU is less than or equal to a preset first width threshold T21, the current CU does not use string prediction by default without decoding "sp_flag".
(3) If the height H of the current CU is less than or equal to a preset first height threshold T31, the current CU does not use string prediction by default without decoding "sp_flag".
(4) If the area S of the current CU is greater than or equal to a preset second area threshold T41, the current CU does not use string prediction by default without decoding "sp_flag".
(5) If the width W of the current CU is greater than or equal to a preset second width threshold T51, the current CU does not use string prediction by default without decoding "sp_flag".
(6) If the height H of the current CU is greater than or equal to a preset second height threshold T61, the current CU does not use string prediction by default without decoding "sp_flag".

In steps (4) to (6), the use of string prediction by a large block is limited because the performance improvement brought by the use of string prediction by the large block is small. On one hand, this limitation can reduce the decoding of syntax elements, and on the other hand, string prediction analysis on the block with the size performed by the decoder side may be skipped.

(7) The methods may be used in combination.
Some specific examples are provided below.
(1) a block with a width of 4 and a height of 4 does not use string matching by default without decoding "sp_flag"; or
(2) a block with a width of 4 or a height of 4 does not use string matching by default without decoding "sp_flag"; or
(3) a block with an area being less than or equal to 32 does not use string matching without decoding "sp_flag".

According to the solution provided in the embodiments of the present disclosure, a series of simplifications are made to the ISC solution, including the limitation on the position of the reference string, the limitation on the quantity of strings, and the limitation on the size of the block. The methods simplify the hardware implementation of ISC.
(1) After the position of the reference string is limited, there is no dependency between the strings, and the strings can be reconstructed in parallel. In addition, similar to ISC, it may be further limited that the reference string is used in only a memory region with a size of 128*128.
(2) The limitation on the quantity of strings can reduce the quantity of strings and reduce the quantity of times of memory being accessed. On the other hand, the decoding of some syntax elements can be reduced, and the decoding performance can be improved.
(3) The limitation on the size of the block may reduce a quantity of small strings, which is conductive to reducing a quantity of times of memory being accessed. On the other hand, the encoder side may skip string prediction analysis on some blocks with sizes (for example, a block with a size of 4*4), to reduce the complexity. In addition, the decoding of string prediction flags on some blocks may be reduced, thereby improving the decoding performance.

Further, an embodiment of the present disclosure provides a video encoding apparatus, applicable to an encoder side/an encoder. The apparatus may include: a current image obtaining unit, configured to obtain a current image, the current image including a largest coding unit, the largest coding unit including a current largest coding unit and an encoded largest coding unit, the current largest coding unit including a current encoding block, and the current encoding block including a current string; a storage space determining unit, configured to store pixels in the current encoding block by using a first part of a storage space with a size of M*W, and store at least some encoded blocks in the encoded largest coding unit and the current largest coding unit by using a second part of the storage space, M being a positive integer greater than or equal to W; and a reference string searching unit, configured to search the second part of the storage space for a reference string of the current string, obtain a predicted value of the current string according to the reference string, and encode the current string.

In an exemplary embodiment, the reference string may be set to meet the following conditions: the reference string is in a range of the current largest coding unit and N encoded largest coding units, the N encoded largest coding units being adjacent to a target side of the current largest coding unit, and N being a positive integer greater than or equal to 1; in a case that pixels in the reference string are in the N encoded largest coding units, pixels in a corresponding target region after the pixels in the reference string are shifted in a predetermined direction by a predetermined pixel have not been encoded; the pixels in the reference string are located within a boundary of an independent encoding region of the current image; and the pixels in the reference string do not overlap with an unencoded block of the current image.

In an exemplary embodiment, a value of N is determined according to a size of the largest coding unit.

In an exemplary embodiment, in a case that a size of the largest coding unit is M*M, there are M predetermined pixels, and the target region is a corresponding $$\frac{M}{2} * \frac{M}{2}$$

region after the pixels in the reference string are shifted in the predetermined direction by the M pixels.

In an exemplary embodiment, in a case that a size of the largest coding unit is K*K, K being a positive integer less than M, there are N*K predetermined pixels, and the target region is a corresponding largest coding unit after the pixels in the reference string are shifted in the predetermined direction by the N*K pixels.

In an exemplary embodiment, minimum coordinates in the target region are not equal to minimum coordinates in the current encoding block.

In an exemplary embodiment, the unencoded block includes the current encoding block, and the pixels in the reference string do not overlap with pixels in the current encoding block.

In an exemplary embodiment, horizontal coordinates of the pixels in the reference string are less than horizontal coordinates of the pixels in the current encoding block; or vertical coordinates of the pixels in the reference string are less than vertical coordinates of the pixels in the current encoding block.

In an exemplary embodiment, the unencoded block includes no current encoding block, the pixels in the reference string are allowed to overlap with encoded pixels in the current encoding block, and the pixels in the reference string do not overlap with unencoded pixels in the current encoding block.

In an exemplary embodiment, the pixels in the reference string are allowed to overlap with encoded pixels in the current encoding block, and the pixels in the reference string do not overlap with encoded pixels in a row including unencoded pixels in the current encoding block.

In an exemplary embodiment, the independent encoding region of the current image includes the current image or a slice and a tile in the current image.

In an exemplary embodiment, in a case that a size of the largest coding unit is M*M, M being a positive integer greater than or equal to 1, pixels in the reference string are from a same $$\frac{M}{2} * \frac{M}{2}$$

aligned region.

In an exemplary embodiment, in a case that a size of the largest coding unit is not M*M, M being a positive integer greater than or equal to 1, pixels in the reference string are from a same largest coding unit.

In an exemplary embodiment, a bounding rectangle of the reference string does not overlap with an unencoded block of the current image.

For specific implementations of the units in the video encoding apparatus provided in various embodiments of the present disclosure, reference may be made to the content in the foregoing video encoding method. Details are not described herein again.

Further, an embodiment of the present disclosure further provides a video decoding apparatus, applicable to a decoder side/a decoder. The apparatus may include: a bit stream obtaining unit, configured to obtain a bit stream of a current image, the bit stream including a largest coding unit, the largest coding unit including a current largest coding unit and an encoded largest coding unit that correspond to the current image, the current largest coding unit including a current decoding block, and the current decoding block including a current string; a storage space storage unit, configured to store pixels in the current decoding block by using a first part of a storage space with a size of M*W, and store at least some decoded blocks in the encoded largest coding unit and the current largest coding unit by using a second part of the storage space, M being a positive integer greater than or equal to W; and a reference string determining unit, configured to search the second part of the storage space for a reference string of the current string, obtain a predicted value of the current string according to the reference string, and decode the current string.

In an exemplary embodiment, the reference string may be set to meet the following conditions: the reference string is in a range of the current largest coding unit and N encoded largest coding units, the N encoded largest coding units being adjacent to a target side of the current largest coding unit, and N being a positive integer greater than or equal to 1; in a case that pixels in the reference string are in the N encoded largest coding units, pixels in a corresponding target region after the pixels in the reference string are shifted in a predetermined direction by a predetermined pixel have not been reconstructed; the pixels in the reference string are located within a boundary of an independent decoding region of the current image; and the pixels in the reference string do not overlap with an undecoded block of the current image.

In an exemplary embodiment, a value of N is determined according to a size of the largest coding unit.

In an exemplary embodiment, in a case that a size of the largest coding unit is M*M, there are M predetermined pixels, and the target region is a corresponding $$\frac{M}{2} * \frac{M}{2}$$

region after the pixels in the reference string are shifted in the predetermined direction by the M pixels.

In an exemplary embodiment, in a case that a size of the largest coding unit is K*K, K being a positive integer less than M, there are N*K predetermined pixels, and the target region is a corresponding largest coding unit after the pixels in the reference string are shifted in the predetermined direction by the N*K pixels.

In an exemplary embodiment, minimum coordinates in the target region are not equal to minimum coordinates in the current decoding block.

In an exemplary embodiment, the undecoded block include the current decoding block, and the pixels in the reference string do not overlap with pixels in the current decoding block.

In an exemplary embodiment, horizontal coordinates of the pixels in the reference string are less than horizontal coordinates of the pixels in the current decoding block; or vertical coordinates of the pixels in the reference string are less than vertical coordinates of the pixels in the current decoding block.

In an exemplary embodiment, the undecoded block includes no current decoding block, the pixels in the reference string are allowed to overlap with reconstructed pixels in the current decoding block, and the pixels in the reference string do not overlap with unreconstructed pixels in the current decoding block.

In an exemplary embodiment, the pixels in the reference string are allowed to overlap with reconstructed pixels in the current decoding block, and the pixels in the reference string do not overlap with reconstructed pixels in a row including unreconstructed pixels in the current decoding block.

In an exemplary embodiment, an independent decoding region of the current image includes the current image or a slice and a tile in the current image.

In an exemplary embodiment, in a case that a size of the largest coding unit is M*M, M being a positive integer greater than or equal to 1, pixels in the reference string are from a same $$\frac{M}{2} * \frac{M}{2}$$

aligned region.

In an exemplary embodiment, in a case that a size of the largest coding unit is not M*M, M being a positive integer greater than or equal to 1, pixels in the reference string are from a same largest coding unit.

In an exemplary embodiment, a bounding rectangle of the reference string does not overlap with an undecoded block of the current image.

For specific implementations of the units in the video decoding apparatus provided in various embodiments of the present disclosure, reference may be made to the content in the foregoing video encoding method and video decoding method. Details are not described herein again.

Although a plurality of units of a device configured to perform actions are discussed in the foregoing detailed description, such division is not mandatory. In fact, according to the implementations of the present disclosure, the features and functions of two or more units described above may be embodied in one unit. On the contrary, the features and functions of one unit described above may be further divided into a plurality of units to be specified.

An embodiment of the present disclosure further provides a computer-readable storage medium, storing a computer program, the program, when executed by a processor, implementing the video encoding method according to the foregoing embodiments.

An embodiment of the present disclosure further provides a computer-readable storage medium, storing a computer program, the program, when executed by a processor, implementing the video decoding method according to the foregoing embodiments.

An embodiment of the present disclosure provides an electronic device, including at least one processor; and a storage apparatus, configured to store at least one program, the at least one program, when being executed by the at least one processor, causing the at least one processor to implement the video encoding method according to the foregoing embodiments.

An embodiment of the present disclosure provides an electronic device, including at least one processor; and a storage apparatus, configured to store at least one program, the at least one program, when being executed by the at least one processor, causing the at least one processor to implement the video decoding method according to the foregoing embodiments.

Figure 9:
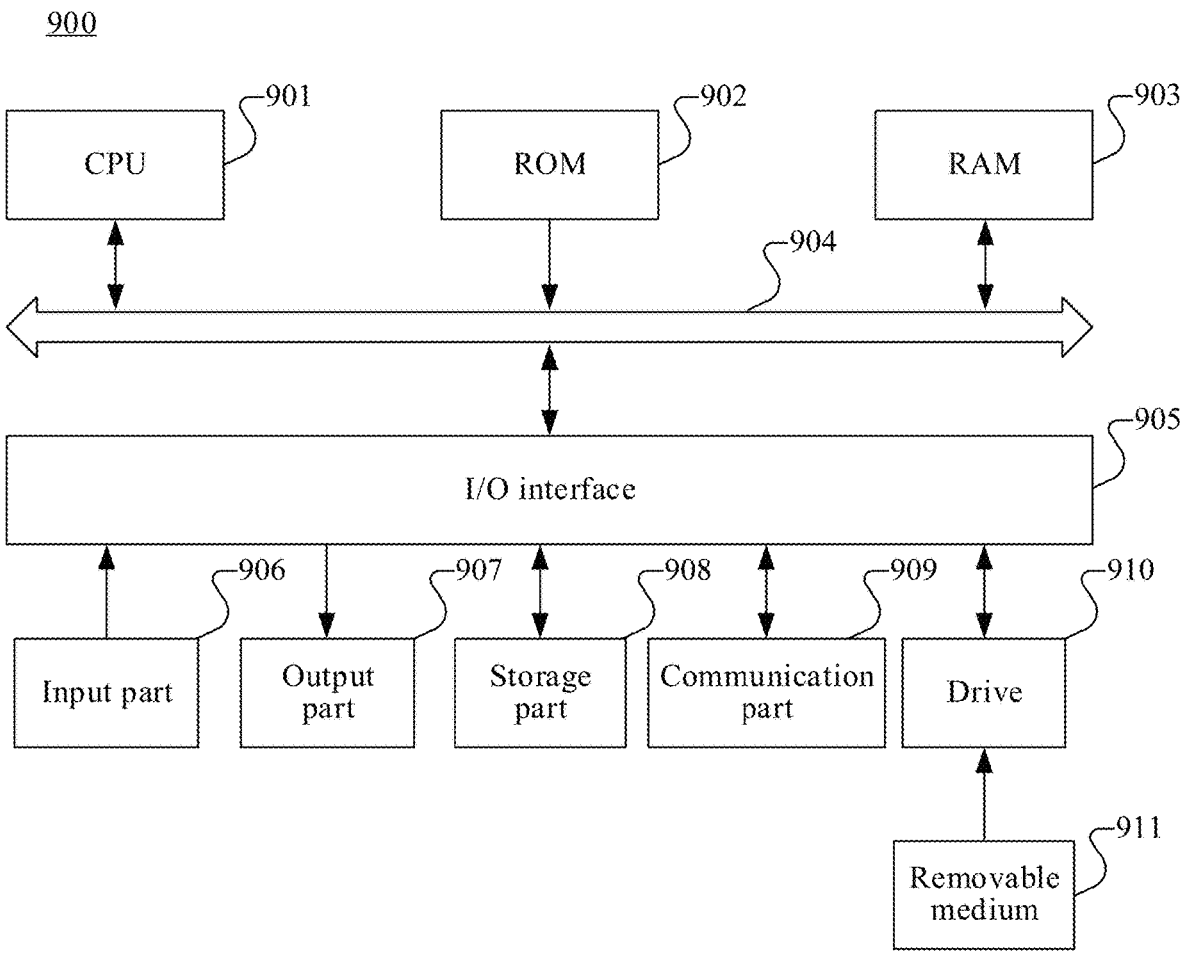
FIG. 9 is a schematic structural diagram of an electronic device adapted to implement an embodiment of the present disclosure.

FIG. 9 is a schematic structural diagram of an electronic device adapted to implement an embodiment of the present disclosure.

The electronic device 900 shown in FIG. 9 is only an example, and does not impose any limitation on the functions and the scope of use of the embodiments of the present disclosure.

As shown in FIG. 9, the electronic device 900 includes a central processing unit (CPU) 901. The CPU can perform various proper actions and processing according to a program stored in a read-only memory (ROM) 902 or a program loaded from a storage part 908 into a random access memory (RAM) 903. The RAM 903 further stores various programs and data required for system operations. The CPU 901, the ROM 902, and the RAM 903 are connected to each other through a bus 904. An input/output (I/O) interface 905 is also connected to the bus 904.

The following components are connected to the I/O interface 905: an input part 906 including a keyboard, a mouse, and the like; an output part 907 including, for example, a cathode ray tube (CRT), a liquid crystal display (LCD), and a loudspeaker; a storage part 908 including hard disk or the like; and a communication part 909 including a network interface card such as a local area network (LAN) card and a modem. The communication portion 909 performs communication processing by using a network such as the Internet. A driver 910 is also connected to the I/O interface 905 as required. A removable medium 911, such as a magnetic disk, an optical disc, a magneto-optical disk, or a semiconductor memory, is installed on the drive 910 as required, so that a computer program read from the removable medium is installed into the storage part 908 as required.

Particularly, according to an embodiment of the present disclosure, the processes described below by referring to the flowcharts may be implemented as computer software programs. For example, an embodiment of the present disclosure includes a computer program product, including a computer program carried on a computer-readable medium. The computer program includes program code for performing the method shown in the flowchart. In such an embodiment, the computer program may be downloaded and installed from the network through the communication portion 909, and/or installed from the removable medium 911. When the computer program is executed by the CPU 901, various functions defined in the method and/or apparatus of this application are executed.

The computer-readable medium shown in the present disclosure may be a computer-readable signal medium, a computer-readable storage medium, or any combination thereof. The computer-readable storage medium may be, for example, but is not limited to, an electric, magnetic, optical, electromagnetic, infrared, or semi-conductive system, apparatus, or component, or any combination thereof. More specific examples of the computer-readable storage medium may include, but are not limited to, an electrical connection having one or more wires, a portable computer magnetic disk, a hard disk, a RAM, a ROM, an erasable programmable read-only memory (EPROM) (or flash memory), an optical fiber, a compact disk read-only memory (CD-ROM), an optical storage device, a magnetic storage device, or any appropriate combination thereof. In the present disclosure, the computer-readable storage medium may be any tangible medium including or storing a program, and the program may be used by or in combination with an instruction execution system, apparatus, or device. In the present disclosure, the computer-readable signal medium may include a data signal included in a baseband or propagated as a part of a carrier, the data signal carrying computer-readable program code. The data signal propagated in such a way may assume a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate, or transmit a program used by or in combination with an instruction execution system, apparatus, or device. The program code contained in the computer-readable storage medium may be transmitted by using any appropriate medium, including but not limited to: a wireless medium, a wire, an optical cable, a radio frequency (RF) medium, or any appropriate combination thereof.

The flowcharts and block diagrams in the accompanying drawings show architectures, functions, and operations that may be implemented by using the method, the apparatus, and the computer program product according to the embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The involved units described in the embodiments of the present disclosure may be implemented in a software manner, or may be implemented in a hardware manner, and the described units may also be disposed in a processor. Names of the units do not constitute a limitation on the units in a specific case.

In another aspect, this application further provides a computer readable medium. The computer readable medium may be included in the electronic device described in the above embodiments, or may exist alone without being assembled into the electronic device. The computer-readable storage medium carries one or more programs, the one or more programs, when executed by the electronic device, causing the electronic device to implement the method described in the following embodiments. For example, the electronic device may implement the steps shown in FIG. 6 or FIG. 8.

An embodiment of this application further provides a computer program product including instructions, the instructions, when run on a computer, causing the computer to perform the method according to the foregoing embodiments.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

In various embodiments, a video encoding method, performed by a video compression device deployed with a video encoder. The method includes obtaining a current image, the current image comprising a largest coding unit, the largest coding unit comprising a current largest coding unit and an encoded largest coding unit, the current largest coding unit comprising a current encoding block, and the current encoding block comprising a current string; storing pixels in the current encoding block by using a first part of a storage space with a size of M*W, and storing at least some encoded blocks in the encoded largest coding unit and the current largest coding unit by using a second part of the storage space, M being a positive integer greater than or equal to W; and/or searching the second part of the storage space for a reference string of the current string, obtaining a predicted value of the current string according to the reference string, and encoding the current string.

In some implementations, the reference string meets the following conditions: the reference string is in a range of the current largest coding unit and N encoded largest coding units, the N encoded largest coding units being adjacent to a target side of the current largest coding unit, and N being a positive integer greater than or equal to 1; in a case that pixels in the reference string are in the N encoded largest coding units, pixels in a corresponding target region after the pixels in the reference string are shifted in a predetermined direction by a predetermined pixel have not been encoded; the pixels in the reference string are located within a boundary of an independent encoding region of the current image; and/or the pixels in the reference string do not overlap with an unencoded block of the current image.

In some implementations, the method further includes determining a value of N according to a size of the largest coding unit.

In some implementations, in a case that a size of the largest coding unit is M*M, there are M predetermined pixels, and the target region is a corresponding $$\frac{M}{2} * \frac{M}{2}$$

region after the pixels in the reference string are shifted in the predetermined direction by the M pixels.

In some implementations, in a case that a size of the largest coding unit is K*K, K being a positive integer less than M, there are N*K predetermined pixels, and the target region is a corresponding largest coding unit after the pixels in the reference string are shifted in the predetermined direction by the N*K pixels.

In some implementations, minimum coordinates in the target region are not equal to minimum coordinates in the current encoding block.

In some implementations, the unencoded block comprises the current encoding block, and the pixels in the reference string do not overlap with pixels in the current encoding block.

In some implementations, horizontal coordinates of the pixels in the reference string are less than horizontal coordinates of the pixels in the current encoding block; or vertical coordinates of the pixels in the reference string are less than vertical coordinates of the pixels in the current encoding block.

In some implementations, the unencoded block comprises no current encoding block, the pixels in the reference string are allowed to overlap with encoded pixels in the current encoding block, and the pixels in the reference string do not overlap with unencoded pixels in the current encoding block.

In some implementations, the pixels in the reference string are allowed to overlap with encoded pixels in the current encoding block, and the pixels in the reference string do not overlap with encoded pixels in a row comprising unencoded pixels in the current encoding block.

In some implementations, in a case that a size of the largest coding unit is M*M, M being a positive integer greater than or equal to 1, pixels in the reference string are from a same $$\frac{M}{2} * \frac{M}{2}$$

aligned region.

In some implementations, a size of the largest coding unit is not M*M, M being a positive integer greater than or equal to 1, pixels in the reference string are from a same largest coding unit.

In some implementations, a bounding rectangle of the reference string does not overlap with the unencoded block of the current image.

In various embodiments, a video decoding method, performed by a video decompression device deployed with a video decoder, the method includes: obtaining a bit stream of a current image, the bit stream comprising a largest coding unit, the largest coding unit comprising a current largest coding unit and an encoded largest coding unit that correspond to the current image, the current largest coding unit comprising a current decoding block, and the current decoding block comprising a current string; storing pixels in the current decoding block by using a first part of a storage space with a size of M*W, and storing at least some decoded blocks in the encoded largest coding unit and the current largest coding unit by using a second part of the storage space, M being a positive integer greater than or equal to W; and/or searching the second part of the storage space for a reference string of the current string, obtaining a predicted value of the current string according to the reference string, and decoding the current string.

In some implementations, the reference string meets the following conditions: the reference string is in a range of the current largest coding unit and N encoded largest coding units, the N encoded largest coding units being adjacent to a target side of the current largest coding unit, and N being a positive integer greater than or equal to 1; in a case that pixels in the reference string are in the N encoded largest coding units, pixels in a corresponding target region after the pixels in the reference string are shifted in a predetermined direction by a predetermined pixel have not been reconstructed; the pixels in the reference string are located within a boundary of an independent decoding region of the current image; and/or the pixels in the reference string do not overlap with an undecoded block of the current image.

In some implementations, the video decoding method may further includes: determining a value of N according to a size of the largest coding unit.

In some implementations, in a case that a size of the largest coding unit is M*M, there are M predetermined pixels, and the target region is a corresponding $$\frac{M}{2} * \frac{M}{2}$$

region after the pixels in the reference string are shifted in the predetermined direction by the M pixels.

In some implementations, in a case that a size of the largest coding unit is K*K, K being a positive integer less than M, there are N*K predetermined pixels, and the target region is a corresponding largest coding unit after the pixels in the reference string are shifted in the predetermined direction by the N*K pixels.

In some implementations, minimum coordinates in the target region are not equal to minimum coordinates in the current decoding block.

In some implementations, the undecoded block comprises the current decoding block, and the pixels in the reference string do not overlap with pixels in the current decoding block.

In some implementations, horizontal coordinates of the pixels in the reference string are less than horizontal coordinates of the pixels in the current decoding block; or vertical coordinates of the pixels in the reference string are less than vertical coordinates of the pixels in the current decoding block.

In some implementations, the undecoded block comprises no current decoding block, the pixels in the reference string are allowed to overlap with reconstructed pixels in the current decoding block, and the pixels in the reference string do not overlap with unreconstructed pixels in the current decoding block.

In some implementations, the pixels in the reference string are allowed to overlap with reconstructed pixels in the current decoding block, and the pixels in the reference string do not overlap with reconstructed pixels in a row comprising unreconstructed pixels in the current decoding block.

In some implementations, the independent decoding region of the current image comprises the current image or a slice and a tile in the current image.

In some implementations, in a case that a size of the largest coding unit is M*M, M being a positive integer greater than or equal to 1, pixels in the reference string are from a same $$\frac{M}{2} * \frac{M}{2}$$

aligned region.

In some implementations, a size of the largest coding unit is not M*M, M being a positive integer greater than or equal to 1, pixels in the reference string are from a same largest coding unit.

In some implementations, a bounding rectangle of the reference string does not overlap with the undecoded block of the current image.

Through descriptions of the foregoing implementations, it is easy for a person skilled in the art to understand that the exemplary implementations described herein can be implemented by software or by combining software with necessary hardware. Therefore, the technical solutions according to the implementations of the present disclosure may be implemented in the form of a software product. The software product may be stored in a non-volatile storage medium (which may be a CD-ROM, a USB flash drive, a removable hard disk, or the like) or a network, and includes several instructions for instructing a computing device (which may be a personal computer, a server, a touch terminal, a network device, or the like) to perform the method according to the implementations of the present disclosure.

After considering the specification and practicing the present disclosure, a person skilled in the art would easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are considered as exemplary only, and a true scope and spirit of the present disclosure are pointed out by the following claims.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A method for decoding video, the method comprising:
    obtaining, by a device comprising a memory storing instructions and a memory in communication with the memory, a bit stream of a current image, the bit stream comprising at least one largest coding unit (LCU), the at least one LCU comprising a current LCU and an encoded LCU that correspond to the current image, the current LCU comprising a current decoding block, and the current decoding block comprising a current string;
    storing, by the device, pixels in the current decoding block by using a first part of a storage space with a size of M*W, and storing at least some decoded blocks in the encoded LCU and the current LCU by using a second part of the storage space, M and W being positive integers, and M being greater than or equal to W; and
    searching, by the device, the second part of the storage space for a reference string for the current string, obtaining a predicted value for the current string according to the reference string, and decoding the current string, wherein the reference string meets the following conditions:
        the reference string is in a range of the current LCU and N encoded LCUs, the N encoded LCUs being adjacent to a target side of the current LCU, and N being a positive integer greater than or equal to 1;
        in response to pixels in the reference string being in the N encoded LCUs, pixels in a corresponding target region after the pixels in the reference string are shifted in a predetermined direction by a predetermined number of pixels are undecoded;
        the pixels in the reference string are located within a boundary of an independent decoding region of the current image; and
        the pixels in the reference string do not overlap with an undecoded block of the current image.

2. The method according to claim 1, further comprising: determining a value of N according to a size of the at least one LCU.

3. The method according to claim 1, wherein in response to a size of the at least one LCU being M*M:
    the predetermined number of pixels is M; and
    in response to the pixels in the reference string being shifted in the predetermined direction by the predetermined number of pixels, the target region is a corresponding $$\frac{M}{2} * \frac{M}{2}$$

region.

4. The method according to claim 1, wherein in response to a size of the at least one LCU is K*K and K being a positive integer less than M:
    the predetermined number of pixels is N*K; and
    in response to the pixels in the reference string being shifted in the predetermined direction by the predetermined number of pixels, the target region is a corresponding LCU.

5. The method according to claim 1, wherein:
    the undecoded block comprises no current decoding block;
    the pixels in the reference string are allowed to overlap with decoded pixels in the current decoding block; and
    the pixels in the reference string do not overlap with undecoded pixels in the current decoding block.

6. The method according to claim 1, wherein:
    the pixels in the reference string are allowed to overlap with decoded pixels in the current decoding block; and
    the pixels in the reference string do not overlap with decoded pixels in a row comprising undecoded pixels in the current decoding block.

7. An apparatus for decoding video, the apparatus comprising:
    a memory storing instructions; and
    a processor in communication with the memory, wherein, when the processor executes the instructions, the processor is configured to cause the apparatus to perform:
        obtaining a bit stream of a current image, the bit stream comprising at least one largest coding unit (LCU), the at least one LCU comprising a current LCU and an encoded LCU that correspond to the current image, the current LCU comprising a current decoding block, and the current decoding block comprising a current string,
        storing pixels in the current decoding block by using a first part of a storage space with a size of M*W, and storing at least some decoded blocks in the encoded LCU and the current LCU by using a second part of the storage space, M and W being positive integers, and M being greater than or equal to W, and
        searching the second part of the storage space for a reference string for the current string, obtaining a predicted value for the current string according to the reference string, and decoding the current string, wherein the reference string meets the following conditions:
    the reference string is in a range of the current LCU and N encoded LCUs, the N encoded LCUs being adjacent to a target side of the current LCU, and N being a positive integer greater than or equal to 1;
    in response to pixels in the reference string being in the N encoded LCUs, pixels in a corresponding target region after the pixels in the reference string are shifted in a predetermined direction by a predetermined number of pixels are undecoded;
    the pixels in the reference string are located within a boundary of an independent decoding region of the current image; and
    the pixels in the reference string do not overlap with an undecoded block of the current image.

8. The apparatus according to claim 7, wherein, when the processor executes the instructions, the processor is configured to further cause the apparatus to perform:
    determining a value of N according to a size of the at least one LCU.

9. The apparatus according to claim 7, wherein in response to a size of the at least one LCU being M*M:
the predetermined number of pixels is M; and
in response to the pixels in the reference string being shifted in the predetermined direction by the predetermined number of pixels, the target region is a corresponding $$\frac{M}{2} * \frac{M}{2}$$

region.

10. The apparatus according to claim 7, wherein in response to a size of the at least one LCU is K*K and K being a positive integer less than M:
the predetermined number of pixels is N*K; and
in response to the pixels in the reference string being shifted in the predetermined direction by the predetermined number of pixels, the target region is a corresponding LCU.

11. The apparatus according to claim 7, wherein:
the undecoded block comprises no current decoding block;
the pixels in the reference string are allowed to overlap with decoded pixels in the current decoding block; and
the pixels in the reference string do not overlap with undecoded pixels in the current decoding block.

12. The apparatus according to claim 7, wherein:
the pixels in the reference string are allowed to overlap with decoded pixels in the current decoding block; and
the pixels in the reference string do not overlap with decoded pixels in a row comprising undecoded pixels in the current decoding block.

13. A non-transitory computer-readable storage medium, storing computer-readable instructions, the computer-readable instructions, when executed by a processor, are configured to cause the processor to perform:
obtaining a bit stream of a current image, the bit stream comprising at least one largest coding unit (LCU), the at least one LCU comprising a current LCU and an encoded LCU that correspond to the current image, the current LCU comprising a current decoding block, and the current decoding block comprising a current string;
storing pixels in the current decoding block by using a first part of a storage space with a size of M*W, and storing at least some decoded blocks in the encoded LCU and the current LCU by using a second part of the storage space, M and W being positive integers, and M being greater than or equal to W; and
searching the second part of the storage space for a reference string for the current string, obtaining a predicted value for the current string according to the reference string, and decoding the current string, wherein the reference string meets the following conditions:
the reference string is in a range of the current LCU and N encoded LCUs, the N encoded LCUs being adjacent to a target side of the current LCU, and N being a positive integer greater than or equal to 1;
in response to pixels in the reference string being in the N encoded LCUs, pixels in a corresponding target region after the pixels in the reference string are shifted in a predetermined direction by a predetermined number of pixels are undecoded;
the pixels in the reference string are located within a boundary of an independent decoding region of the current image; and
the pixels in the reference string do not overlap with an undecoded block of the current image.

14. The non-transitory computer-readable storage medium according to claim 13, wherein, when the computer-readable instructions are executed by the processor, the computer-readable instructions are configured to further cause the processor to perform:
determining a value of N according to a size of the at least one LCU.

15. The non-transitory computer-readable storage medium according to claim 13, wherein in response to a size of the at least one LCU being M*M:
the predetermined number of pixels is M; and
in response to the pixels in the reference string being shifted in the predetermined direction by the predetermined number of pixels, the target region is a corresponding $$\frac{M}{2} * \frac{M}{2}$$

region.

16. The non-transitory computer-readable storage medium according to claim 13, wherein in response to a size of the at least one LCU is K*K and K being a positive integer less than M:
the predetermined number of pixels is N*K; and
in response to the pixels in the reference string being shifted in the predetermined direction by the predetermined number of pixels, the target region is a corresponding LCU.

17. The non-transitory computer-readable storage medium according to claim 13, wherein:
the undecoded block comprises no current decoding block;
the pixels in the reference string are allowed to overlap with decoded pixels in the current decoding block; and
the pixels in the reference string do not overlap with undecoded pixels in the current decoding block.

* * * * *